United States Patent [19]

Kogane et al.

[11] Patent Number: 5,625,431
[45] Date of Patent: Apr. 29, 1997

[54] AUTOMATIC FILM WINDING DEVICE FOR A CAMERA

[75] Inventors: Mikio Kogane; Yoshikazu Majima, both of Kanagawa; Kazuo Daigo, Tokyo, all of Japan

[73] Assignee: Fuji Photo Film Co., Ltd., Kanagawa, Japan

[21] Appl. No.: 375,703

[22] Filed: Jan. 20, 1995

[30] Foreign Application Priority Data

Feb. 8, 1994 [JP] Japan .................................. 6-014456
Apr. 27, 1994 [JP] Japan .................................. 6-089555

[51] Int. Cl.$^6$ .............................. G03B 1/18; G03B 17/42; G03B 1/00
[52] U.S. Cl. .............................. 396/418; 396/396; 396/401
[58] Field of Search .............................. 354/173.1, 170, 354/171, 172, 203, 204, 212, 213, 217, 218

[56] References Cited

U.S. PATENT DOCUMENTS

| | | | |
|---|---|---|---|
| 4,268,148 | 5/1981 | Wakabayashi | 354/173 |
| 4,325,622 | 4/1982 | Hartung | 354/170 |
| 4,383,747 | 5/1983 | Tezuka | 354/173 |
| 4,419,001 | 12/1983 | Tominaga et al. | 354/173.1 |
| 4,529,282 | 7/1985 | Yamamoto | 354/173.1 |
| 4,881,092 | 11/1989 | Fukahori et al. | 354/152 |
| 4,949,109 | 8/1990 | Shimada et al. | 354/173.1 |
| 5,343,266 | 8/1994 | Pummell et al. | 354/340 |

FOREIGN PATENT DOCUMENTS 5-297441  11/1993  Japan .

*Primary Examiner*—Safet Metjahic
*Assistant Examiner*—John Chizmar
*Attorney, Agent, or Firm*—Young & Thompson

[57] ABSTRACT

A film winding unit is removably attached to a film unit so as to engage a coupling gear with a film winding wheel. The coupling gear is connectable to a gear train through a clutch member. While the film winding wheel of the film unit is unlocked, the clutch member is placed in a power transmitting position for transmitting rotational movement of a motor to the coupling gear through the gear train. Upon the film winding mechanism being locked, a large load is applied to the clutch member, so that the clutch member slips into a disconnecting position to disconnect the motor from the coupling gear. In cooperation with the movement of the clutch member into the disconnecting position, a motor inactivating device inactivates the motor. After a release button of a film winding unit is depressed to depress a shutter button of the film unit, a motor activating device activates the motor in cooperation with returning movement of the release button. The rotational movement of the motor causes the clutch member to return to the power transmitting position, and is transmitted to the film winding wheel through the coupling gear.

10 Claims, 28 Drawing Sheets

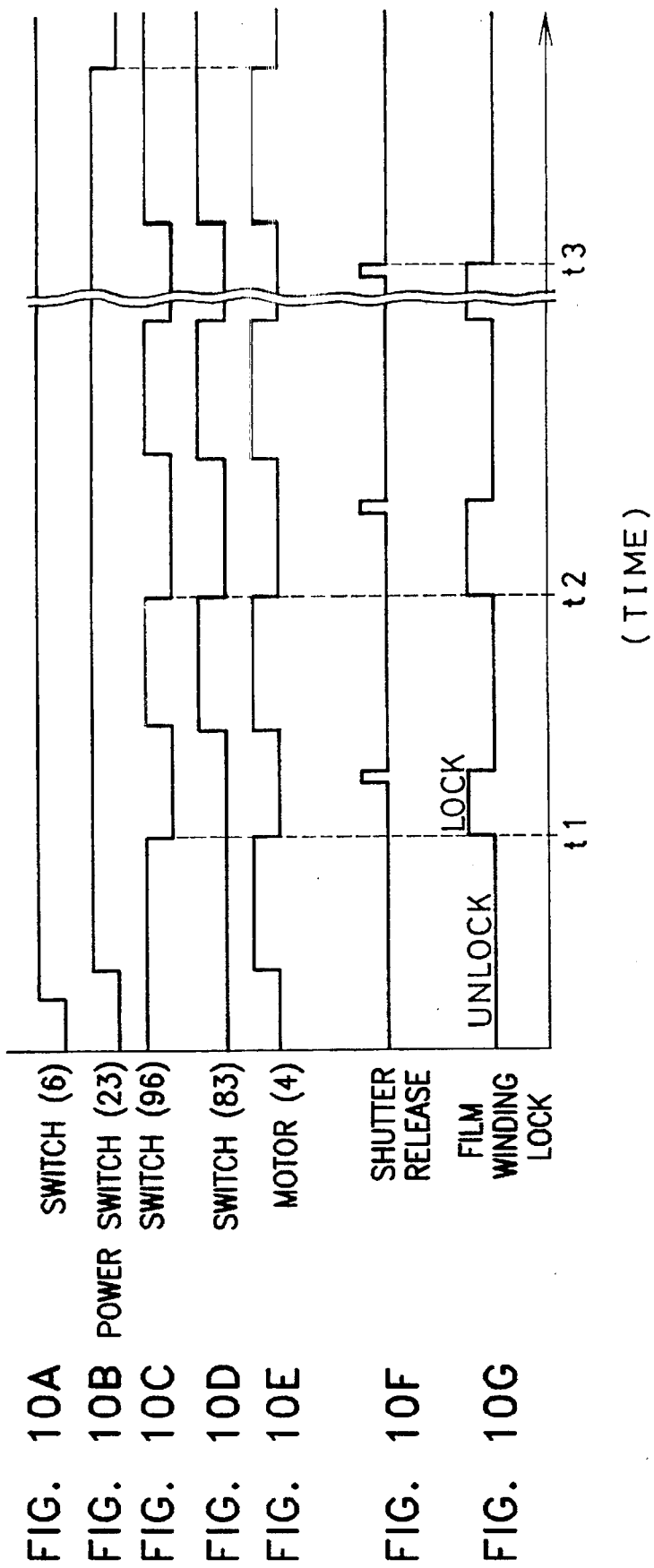

AUTOMATIC FILM WINDING DEVICE FOR A CAMERA

BACKGROUND OF THE INVENTION

1. Field of the Invention

The present invention relates to a film winding device for automatically winding a filmstrip after each exposure in a camera, especially, a film winding device which is removably attachable to a lens-fitted photographic film unit.

2. Related Art

Lens-fitted photographic film unit (hereinafter simply referred to as film units) are well known, having a simple photograph-taking mechanism and a ISO 135 type photographic film cassette preloaded therein. Such film units can be purchased nearly everywhere at low prices, making it possible to take photographs anywhere without carrying about heavy and expensive cameras.

The film unit has a unit body which is constituted of a basic portion, a rear cover and a front cover. A photo-taking unit including a taking lens, a shutter mechanism, a film frame counter mechanism, a film winding-stopping mechanism and other elements, is attached to the basic portion. The front cover is removably attached to the front of the basic portion. A roll of unexposed photographic film which is pulled out from a container of the film cassette is placed in a film supply chamber of the basic portion, while the container is placed in a film take-up chamber of the basic portion. A film winding wheel having teeth around its periphery is coaxially engaged with a spool of the container to rotate the spool together.

When the film winding wheel is rotated to wind up the film, the strip of the film extending from the film supply chamber to the film take-up chamber is advanced to rotate a sprocket wheel, such that the sprocket wheel makes one revolution while the filmstrip is advanced one frame amount, and then the film winding wheel and the sprocket wheel is locked to stop rotating. During the one frame advance, the shutter mechanism is set to a cocked position. Upon depression of a shutter button, an exposure is executed and, at the same time, the film winding wheel and the sprocket wheel are unlocked. Thus, the filmstrip is wound up for the next exposure. After the last frame is exposed, the filmstrip is entirely wound into the container by rotating the film winding wheel. Thereafter, the film winding wheel starts idling to notice the user that the film winding is complete. Then, the user forwards the film unit with the exposed filmstrip to a photofinisher. The photofinisher removes the container containing the exposed filmstrip from the film unit, and processes the exposed filmstrip for making prints therefrom in a conventional manner. The consequent prints and the developed filmstrip are returned to the user.

Since the film unit cannot make an exposure unless the film winding wheel is rotated to advance the filmstrip one frame after each exposure and thus cock the shutter mechanism, it is not a few that the photographer forgets to wind up the filmstrip and misses the moment for a good picture. To solve this inconvenience, JPA 5-297441 discloses an automatic film winding device which can be removably attached to the film unit.

The known film winding device is constituted of a shutter release member, an externally operated power switch, a motor, a reduction gear unit, a drive gear, a motor current detection circuit and other elements. The shutter release member is depressed like as a shutter button of the film unit, thereby depressing the shutter button. The drive gear is adapted to gear into the film winding wheel, so that the film winding wheel is rotated by the motor through the reduction gear unit and the drive gear when the power switch is turned ON to activate the motor. When the filmstrip is advanced one frame, the film winding wheel is locked, so that a large load is applied to the motor through the drive gear and the reduction gear unit. As a result, the current flows through the motor jumps up. The motor current detection circuit detects the current through the motor so as to turn the power switch OFF upon the rapid increase of the motor current. Thus, the motor is inactivated when the filmstrip has been advanced by one frame.

However, when the motor stops, a tension is applied to the filmstrip due to the tendency of the sprocket wheel and the film winding wheel toward the film winding direction. Therefore, the moment when the shutter is released and thus the film winding wheel and the sprocket wheel is unlocked, the filmstrip slightly moves in the film winding direction. If the filmstrip is still in motion during an exposure time, the image recorded on the filmstrip is blurred.

Moreover, the known film winding device needs to turn the power switch ON after each shutter release. This is inconvenient, and could be a cause of missing a good shutter chance if the photographer forgets to turn the power switch ON. Also because the reduction gear unit is a simple gear train, the teeth of the reduction gear tend to be damaged due to a large load which is applied during a delay time from the locking of the film winding wheel to the inactivation of the motor by the motor current detection circuit.

Since the motor is stopped when the current therethrough jumps up, the motor continues to be driven after the completion of exposure of the last frame when the film winding wheel will not be locked any more, and hence the motor current does not increase any more. If the film winding unit is detached from the film unit while the motor is being driven, a load would be applied to the film winding wheel and the drive gear, which would damage the teeth of these elements.

OBJECT OF THE INVENTION

In view of the foregoing, a primary object of the present invention is to provide a film winding device which prevents the deviation of the filmstrip upon unlocking of the film winding wheel and thus prevents the blurring of the image recorded on the filmstrip.

Another object of the present invention is to provide a film winding device which is easy and safe to operate, and excessive load will not be applied on the power transmission device between the motor and the film winding wheel.

SUMMARY OF THE INVENTION

To achieve the above objects, the present invention provides a rotary member which can be coupled to a spool of a container of a film cassette and rotate the spool in a film winding direction, a power transmission device for transmitting rotational movement of a drive source to the rotary member, an activation device for activating the drive source after a shutter mechanism of a camera or a film unit is released, a clutch member included in the power transmission device so as to disconnect the power transmission between the drive source and the spool when the film winding mechanism of the camera or a film unit is locked, and an inactivation device for inactivating the drive source in cooperation with the disconnecting movement of the clutch member.

Upon depression of a shutter button of the camera or the film unit, the shutter mechanism is actuated to make an exposure, and the film winding mechanism is unlocked to permit winding up the filmstrip. After the exposure, the activation device activates the drive source, and the rotational movement of the drive source is transmitted to the rotary member through the power transmission device. As a result, the spool is rotated in the film winding direction to advance the filmstrip. When the filmstrip has been advanced by one frame amount, the film winding mechanism is locked, so that a large load is applied to the drive source through the power transmission device. As a result, the clutch member slips to disconnect the drive source from the spool. In cooperation with the disconnection of the clutch member, the inactivation device inactivates the drive source.

Because the clutch member disconnect the spool from the drive source when the filmstrip has been advanced by one frame amount, the filmstrip is released from the tension toward the film winding direction. Therefore, the filmstrip will not be deviated when the film winding mechanism is unlocked upon depression of the shutter button, in addition that no excessive load is applied on the power transmission device.

The drive source may be a motor or a clock work. The clutch member may be a claw clutch, a friction clutch, a magnetic clutch, or the like.

BRIEF DESCRIPTION OF THE DRAWINGS

Other objects and advantages of the present invention will become apparent in the following detailed description of the preferred embodiments when read in connection with the accompanying drawings, wherein like reference numerals designates like or corresponding parts throughout the several views, and wherein:

FIGS. 10A–10G show timing charts of the film winding unit shown in FIG. 5;

FIGS. 26 to 29 are explanatory views illustrating the operation of the film winding unit shown in FIG. 25, wherein FIG. 26 shows an initial position, FIG. 27 shows a shutter release position, FIG. 28 shows a motor activating position, and FIG. 29 shows a position when the film winding wheel is locked;

DETAILED DESCRIPTION OF THE PREFERRED EMBODIMENT

Figure 1:
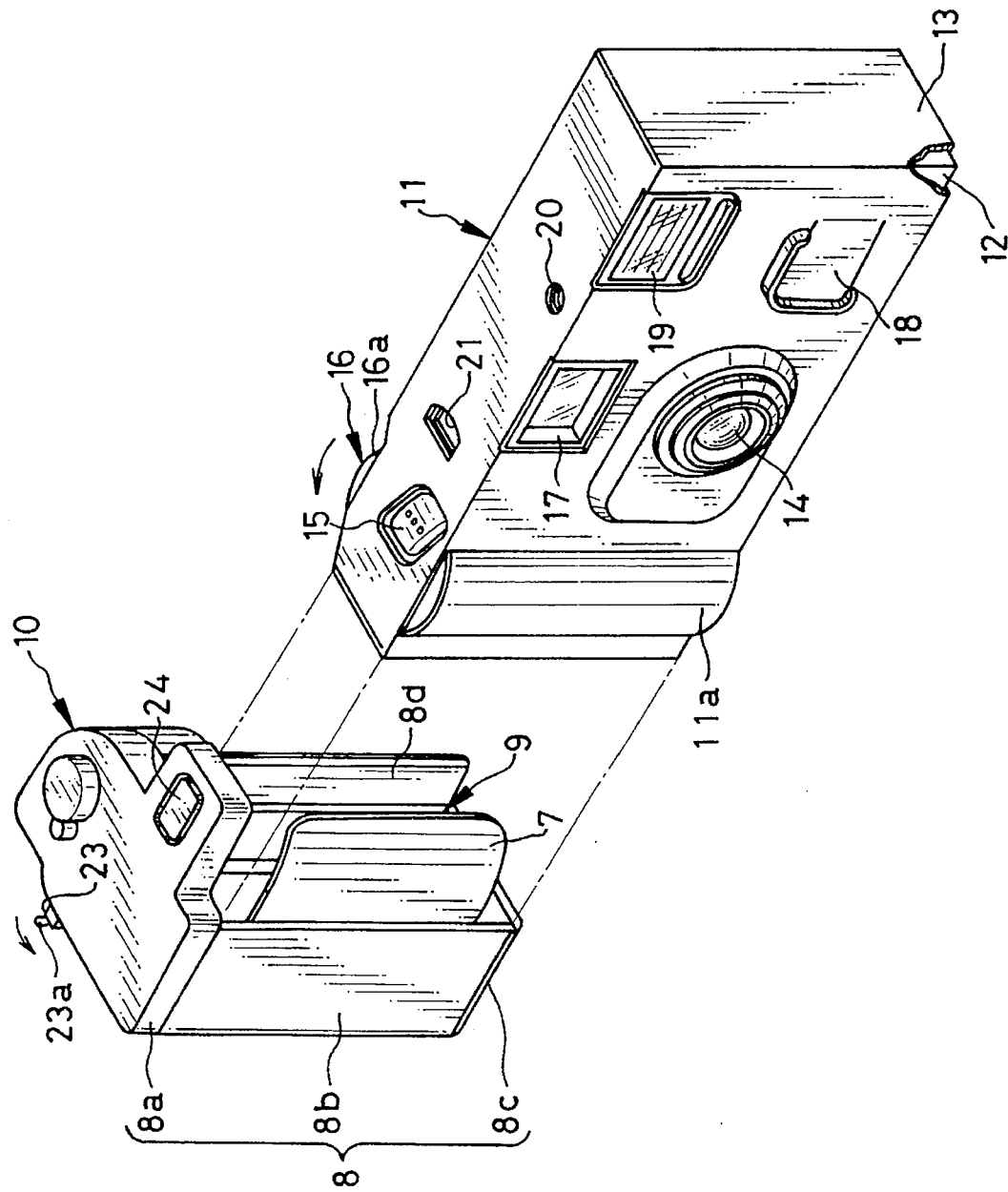
FIG. 1 is a perspective view showing the appearance of a film winding unit and a film unit attachable to the film winding unit.

FIG. 1 shows a film winding unit 10 and a film unit 11. The film unit 11 is constituted of an unit body 12 and an outer case 13 wrapping the unit body 12. The unit body 12 has a forwardly convex grip 11a formed integrally on a left front side thereof in FIG. 1. The outer case 13 is provided with many openings or cut-outs for exposing a taking lens 14, a shutter button 15, a film winding wheel 16, a finder objective window 17, a flash charge switch 18, a flash window 19, a charge lamp window 20 and a frame counter window 21 and other necessary elements of the unit body 12.

To take a photograph, the film winding wheel 16 is rotated in a counterclockwise direction as shown by an arrow in FIG. 1, to wind up photographic film until the film winding wheel 16 is locked. The film winding wheel 16 has teeth 16a around its periphery. Upon depression of the shutter button 15 in this position, an exposure is accomplished. To effect a flash photography, the photographer depresses the shutter button 15 while depressing the flash charge switch 18 formed on the right front side.

The film winding unit 10 is removably attached to the left side of the film unit. The film winding unit 10 has a housing 8 constituted of a top cover portion 8a, a main portion 8b and a bottom cover portion 8c, and the main portion 8b has an opening 9 on the right side for accepting the film unit 11. A power switch 23 and a release button 24 which is actuated to depress the shutter button 15 are mounted on the top cover portion 8a to be accessible from outside. There may be ornamental designs and the instructions about the film winding unit 10 printed on the outer surface of the main portion 8b.

Figure 2:
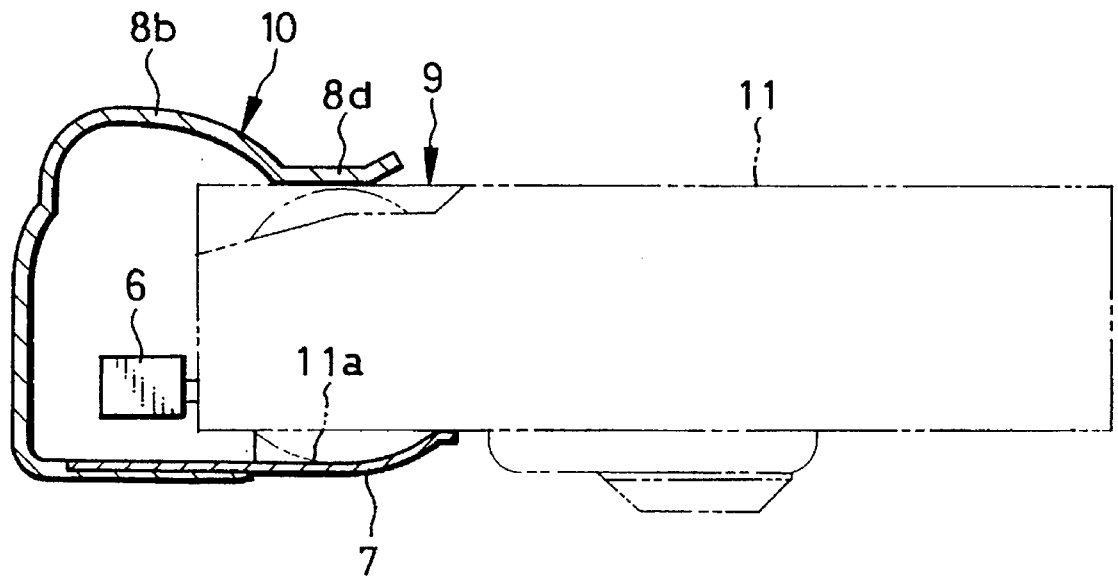
FIG. 2 is an explanatory horizontal sectional view of the film winding unit shown in FIG. 1, illustrating the condition attached to the film unit.

When the film winding unit 10 is attached to the film unit 11 as shown in FIG. 2, a supporting plate 8d formed on the rear side near the opening 9 supports the film unit 11 from the back, while a plate spring 7 mounted on the front side in opposition to the supporting plate 8d supports the film unit 11 at the front of the grip 11a. The resiliency of the plate spring 7 facilitates attaching and detaching the film winding unit 10. The amount of insertion of the film unit 11 into the film winding unit 10 is limited by a switch 6, which is mounted inside the film winding unit 10 so as to be turned on when the left side of the film unit 11 is brought into contact with it. Thus, the switch 6 detects completion of attachment of the film unit 11.

Figure 3:
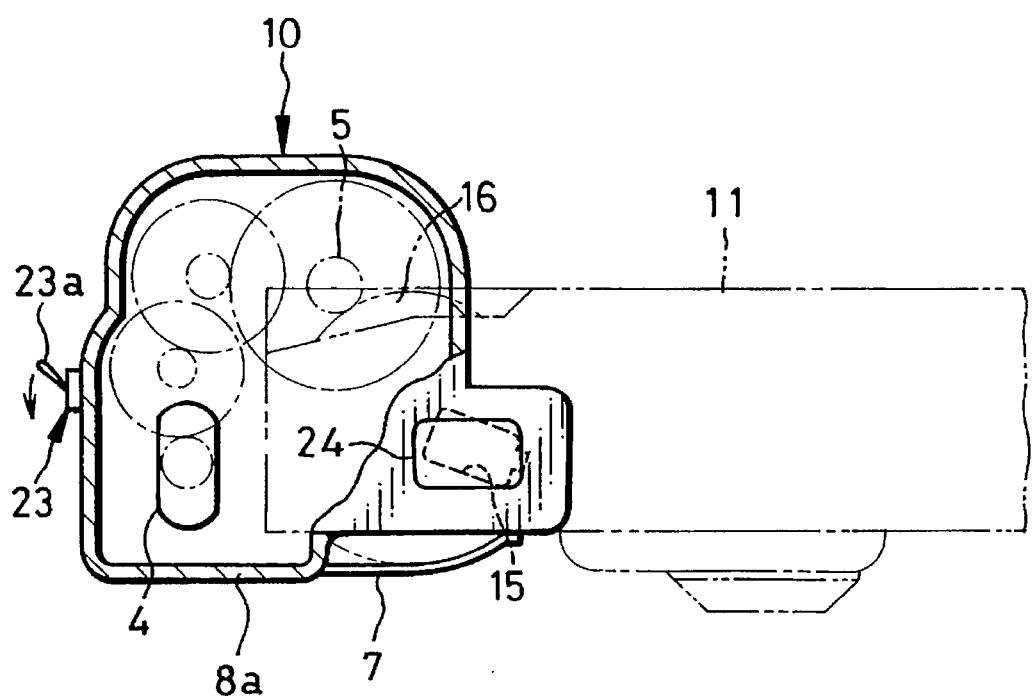
FIG. 3 is an explanatory horizontal sectional view of the film winding unit shown in FIG. 1, for illustrating coupling of a coupling gear with a film winding wheel.

In this condition, a coupling gear 5 meshes with the teeth 16a of the film winding wheel 16 through the opening 9, as is shown in FIG. 3. Also the release button 24 is disposed right above the shutter button 15. Since the shutter button 15 is disposed behind the release button 24 when the film unit 11 is joined to the film winding unit 10, an exposure is made by depressing the release button 24.

The power switch 23 is turned ON by shifting a lever 23a as shown by an arrow in FIG. 3 to supply power to a motor 4 of the film winding unit 10. Thereafter, the photographic film can be automatically wound up or advanced upon each actuation of the release button 24. When all available frames have been exposed and hence the film winding wheel 16 is not locked any more, the power switch 23 is turned OFF to stop driving the motor 4. Thereafter, the film unit 11 is detached from the film winding unit 10.

Figure 4:
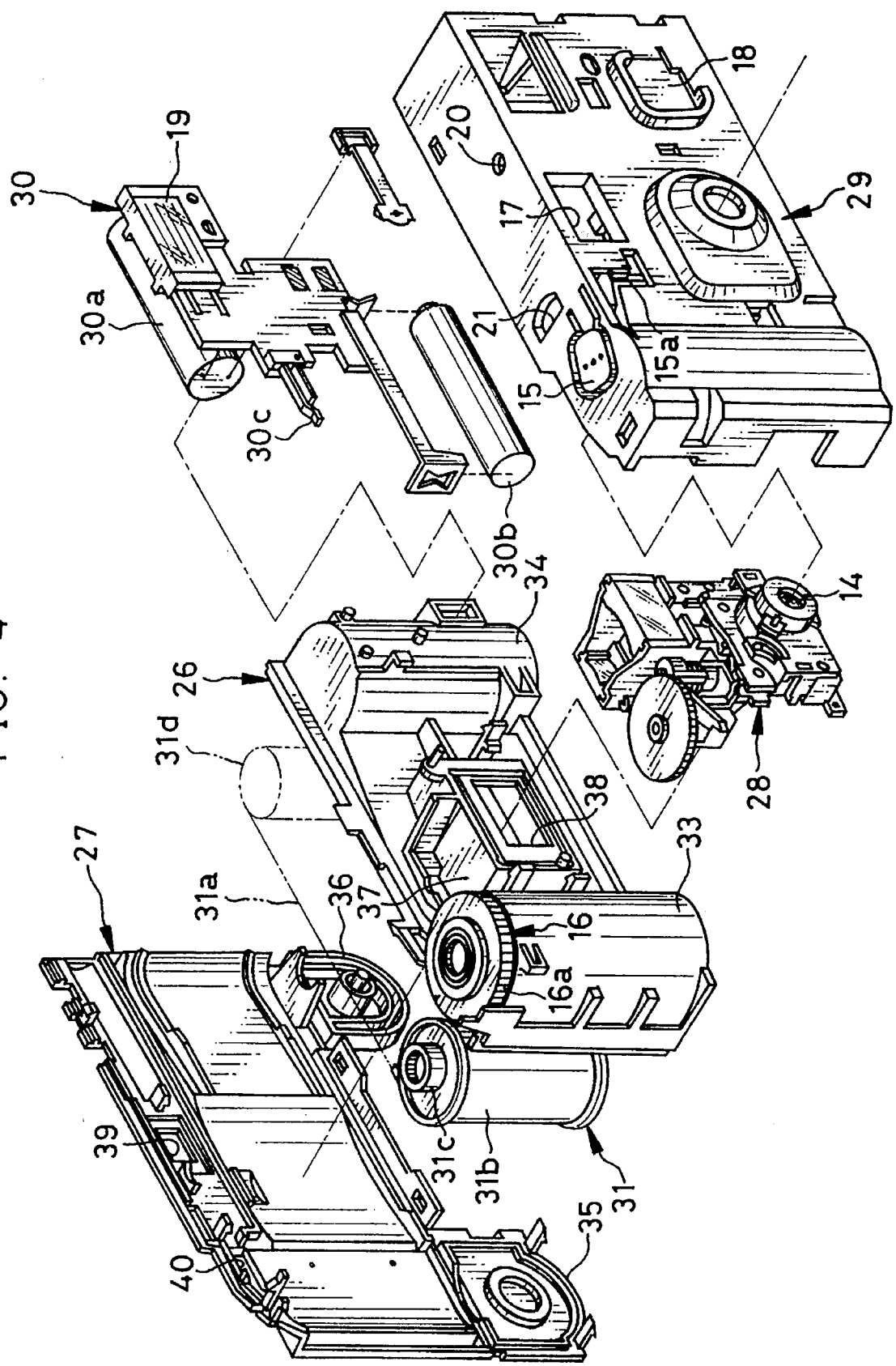
FIG. 4 is an exploded perspective view of an unit body of the film unit shown in FIG. 1.
Figure 5:
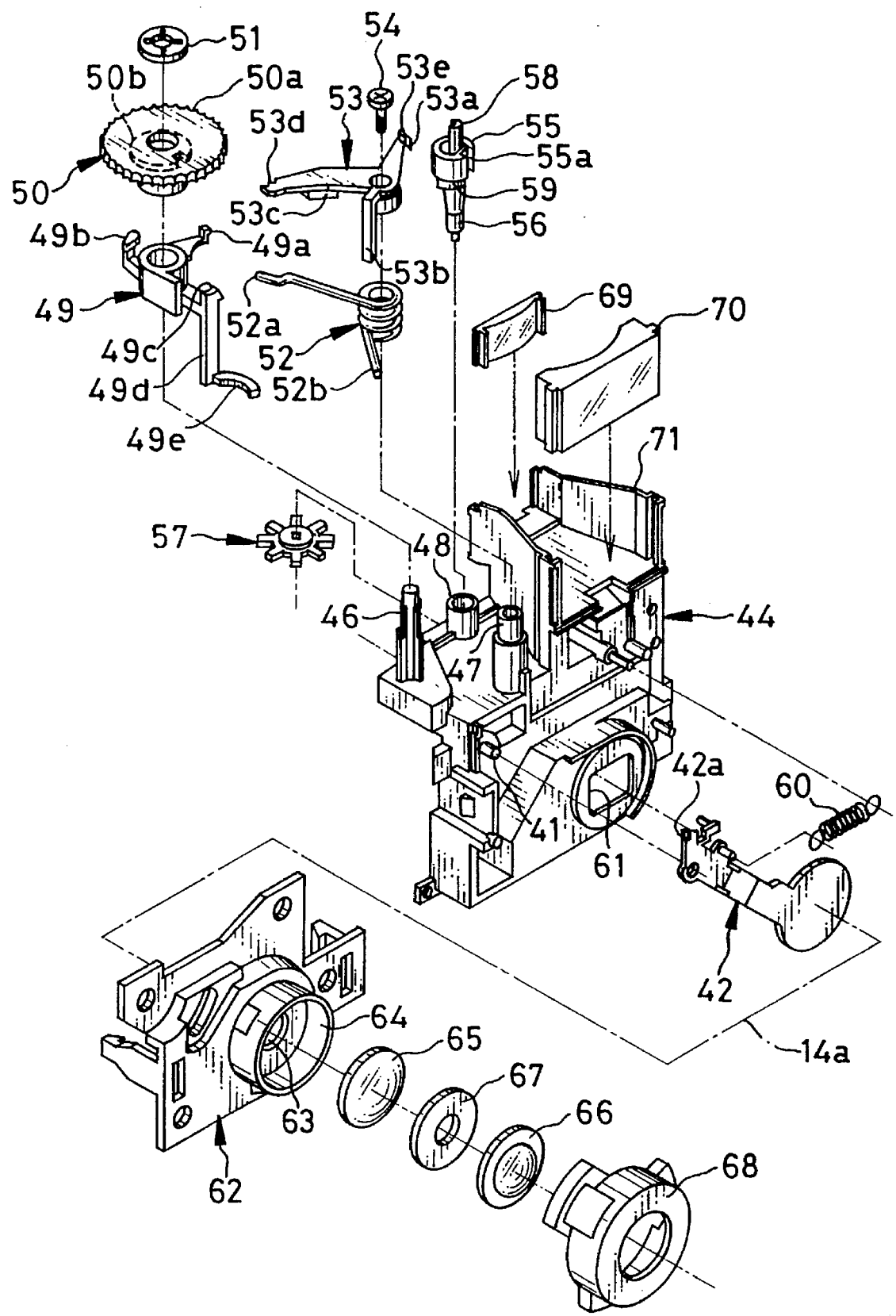
FIG. 5 is an exploded perspective view of a photo-taking unit of the film unit.

As shown in FIG. 4, the unit body 12 of the film unit 11 is constituted of a basic portion 26, a rear cover 27, a photo-taking unit 28, a front cover 29 and a flash unit 30. A photographic film cassette 31 of ISO 135 type (ISO: 1007-1979 version) is loaded in the basic portion 26. The photo-taking unit 28 is removably attached to the front of the basic portion 26. The photo-taking unit 28 includes the taking lens 14, a shutter mechanism, a film frame counter mechanism, a film winding-stopping mechanism and other elements which are assembled into an unit, as shown in FIG. 5. The front cover 29 is removably attached to the front of the basic body 26.

The flash unit 30 charges a main capacitor 30a with a boosted voltage from a size AA battery 30b while the flash charge switch 18 is depressed. When a synchronizing contact 30c is turned on by the shutter mechanism when the shutter button 15 is depressed, a trigger signal is applied to a discharge tube of the flash emitting portion 19, so that the discharge tube flashes while discharging the high voltage charge on the main capacitor 30a.

The photographic film cassette 31 includes a photographic filmstrip 31a and a container 31b for containing the filmstrip 31a in light-tight fashion. The container 31b has a spool 31c which is secured to an end of the filmstrip 31a so that the filmstrip 31a will be wound up into the container 31b by rotating the spool 31c.

The basic portion 26 has a film take-up chamber 33 which holds the container 31b and a film supply chamber 34 which holds a roll of the photographic filmstrip 31a unexposed and previously withdrawn from the container 31b. The rear cover 27 is removably attached to the rear side of the basic portion 26 to light-tightly close the filmstrip 31a. The film take-up chamber and the film supply chamber 33 and 34 have open bottoms which are closed by bottom lids 35 and 36 which are integrally formed with the rear cover 27.

The film winding wheel 16 is rotatably mounted on the top of the film take-up chamber 33, and partly protrudes to the outside through a slot 40 of the rear cover 27 so as to permit externally rotating the film winding wheel 16. The film winding wheel 16 is coaxially engaged with the spool 31c of the container 31b loaded in the film take-up chamber 33.

Between the film take-up chamber 33 and the film supply chamber 34 is a light-shielding box 37 formed integrally therewith. An opening 38 is formed in front of the light-shielding box 37, and a not-shown exposure opening is formed behind the opening 38. The photo-taking unit 28 is removably attached to the front of the light-shielding box 37, so that light through the taking lens 14 is lead to the exposure opening through the opening 38. A finder eyepiece window 39 is formed integrally with the rear cover 15. The finder objective window 17 and the shutter button 15 are formed integrally with the front cover 18, and a rod 15a is embedded in the bottom surface of the shutter button 15, as will be described in detail below.

As shown in FIG. 5, the photo-taking unit 28 has a base portion 44, on the top of which two axles 46 and 47 and a bearing sleeve 48 are integrally formed. A shutter actuating lever 49 and a frame counter dial 50 are fitted on the axle 46, and are secured by a snap ring 51, so as to be pivotal. A spring 52 and an arresting lever 53 are fitted on the axle 47, and are secured by a screw 54, so as to be pivotal.

The bearing sleeve 48 receives a shaft 56 of a cam member 55 to be rotatably therein. The shaft 56 is engaged with a sprocket wheel 57 which is disposed below the bearing sleeve 48, such that the cam member 55 and the sprocket wheel 57 rotate together. A claw 53a of the arresting lever 53 contacts the periphery of the cam member 55. A one-tooth gear 58 is integrally formed in a top tip of the cam member 55, which meshes with teeth 50a of the frame counter dial 50. A shutter cocking cam 59 is integrally formed in a lower portion of the cam member 55, and a claw 49a of the shutter actuating lever 49 is in contact with the shutter cocking cam 59. One end 52a of the spring 52 is engaged with a spring receiving portion 49b of the shutter actuating lever 49, and the other end 52b of the spring 52 is engaged with a downward arm 53b of the arresting lever 53, so as to urge the shutter actuating lever 49 to rotate counterclockwise about the axle 46, and urge the arresting lever 53 to rotate clockwise about the axle 47.

An axle 41 is formed on the front of the base portion 44 to extend parallel to an optical axis 14a of the taking lens 14. The axle 41 pivotally holds a crank-shaped shutter blade 42. The shutter blade 42 is usually located in a closing position under the force of a spring 60, closing a shutter opening 61 which is formed through the base portion 44 coaxially with the optical axis 14a. The shutter blade 42 is rotatable about the axle 41 between the closing position and an open position to open the shutter opening 61.

A shutter cover 62 is secured to the front of the shutter blade 42 to prevent the shutter blade 42 from flattering in the direction of the optical axis 14a. The shutter cover 62 has a stop aperture 63 and a lens barrel 64 formed coaxially with the optical axis 14a. A rear lens element 65, a front lens element 66 and a spacer 67 between these lens elements are inserted in the lens barrel 64 to constitute the taking lens 14, and are secured by a lens cover 68. A holding frame 71 for holding finder lenses 69 and 70 is integrally formed on the top of the base portion 44. The finder lenses 69 and 70 are disposed between and aligned with the finder objective and eyepiece windows 17 and 39.

Figure 6:
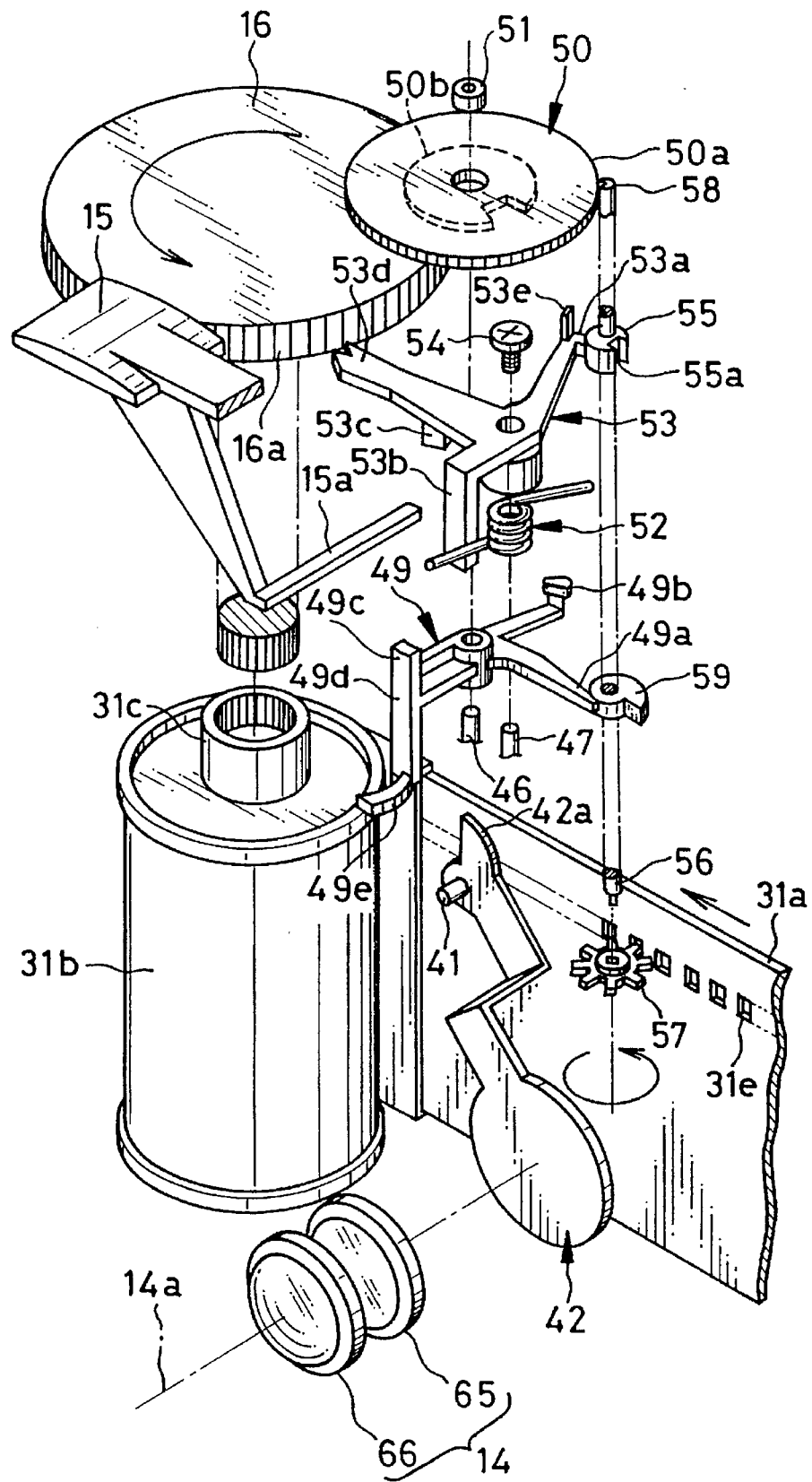
FIG. 6 is an explanatory view illustrating the operation of the exposure mechanism of the photo-taking unit shown in FIG. 5.

As shown in FIG. 6, when the film winding wheel 16 is rotated in a direction shown by an arrow, the spool 31c of the container 31b is rotated to wind up the filmstrip 31a. Since the filmstrip 31a is provided with eight perforations 31e per frame, and the sprocket wheel 57 has nine sprockets engageable in the perforations 31e, one counterclockwise revolution of the sprocket wheel 57 corresponds to one-frame advance of the filmstrip 31a.

Along with the one counterclockwise revolution of the sprocket wheel 57, the cam member 55 makes one revolution. As a result, the claw 53a of the arresting lever 53 is trapped in a notch 55a which is formed in the periphery of the cam member 55, to stop the cam member 55 and thus the sprocket wheel 57 from rotating. Simultaneously, the arresting lever 53 slightly rotates clockwise to bring a lock claw 53d thereof into engagement with the teeth 16a of the film winding wheel 16, thereby locking the film winding wheel 16.

One-frame advance of the filmstrip 31a also advances the frame counter dial 50 one unit. The frame counter dial 50 is provided with scales on its top surface for indicating the number of available or remaining unexposed frames, so that the number of presently available frames is visible through the frame counter window 21 which is formed through the front cover 29.

The shutter actuating lever 49 has a leg 49d extending downward and having a striking stick 49e at the bottom tip thereof to form an L-shape with the leg 49d. A free end of the striking stick 49e is opposed to the shutter blade 42. When the one-frame advance of the filmstrip 31a causes the shutter cocking cam 59 to rotate together with the cam member 55, the shutter actuating lever 49 is rotated clockwise against the force of the spring 52. As a result, an upward projection 49c of the shutter actuating lever 49 is brought into engagement with a projection 53c of the arresting lever 53, and is thus maintained in a cocked position against the force of the spring 52, wherein the shutter actuating lever 49 is removed from a claw 42a of the shutter blade 42.

When the shutter button 15 is depressed, the rod 15a pushes the downward arm 53b of the arresting lever 53 to rotate counterclockwise. As a result, the projection 53c of the arresting lever 53 is disengaged from the upward projection 49c of the shutter actuating lever 49. Then, the shutter actuating lever 49 rashly rotates counterclockwise under the force of the spring 52, striking the claw 42a of the shutter blade 42 with the striking stick 49e, and thus causing the shutter blade 42 to swing about the axle 41 to open the shutter opening 61. The counterclockwise rotation of the arresting lever 53 simultaneously disengages the claw 53a from the notch 5a of the cam member 55 to permit rotation of the sprocket wheel 57, and also disengages the lock claw 53d from the teeth 16a of the film winding wheel 16 to permit rotation of the film winding wheel 16. After the striking stick 49e gets over the claw 42a, the shutter blade 42 is swung back to the closing position under the force of the spring 60.

When the shutter button 15 is released from the depression, also the arresting lever 53 is released from the depression of the rod 15a and returns to the initial position under the force of the spring 52, wherein the shutter actuating lever 49 is allowed to be moved to the cocked position by the next film winding operation.

The frame counter dial 50 has a cam 50b formed integrally on the bottom side thereof. The cam 50b will contact the upward projection 53e of the arresting lever 53 and rotate the lever 53 counterclockwise while the film winding wheel 16 is rotated after the last frame of the filmstrip 31a is exposed. The counterclockwise rotation of the arresting lever 53 causes the claw 53a to remove off the notch 55a of the cam member 55 and permit the sprocket wheel 57 to rotate freely. Therefore, the film winding wheel 16 can keep rotating to wind the filmstrip 31a entirely into the container 31b.

Figure 7:
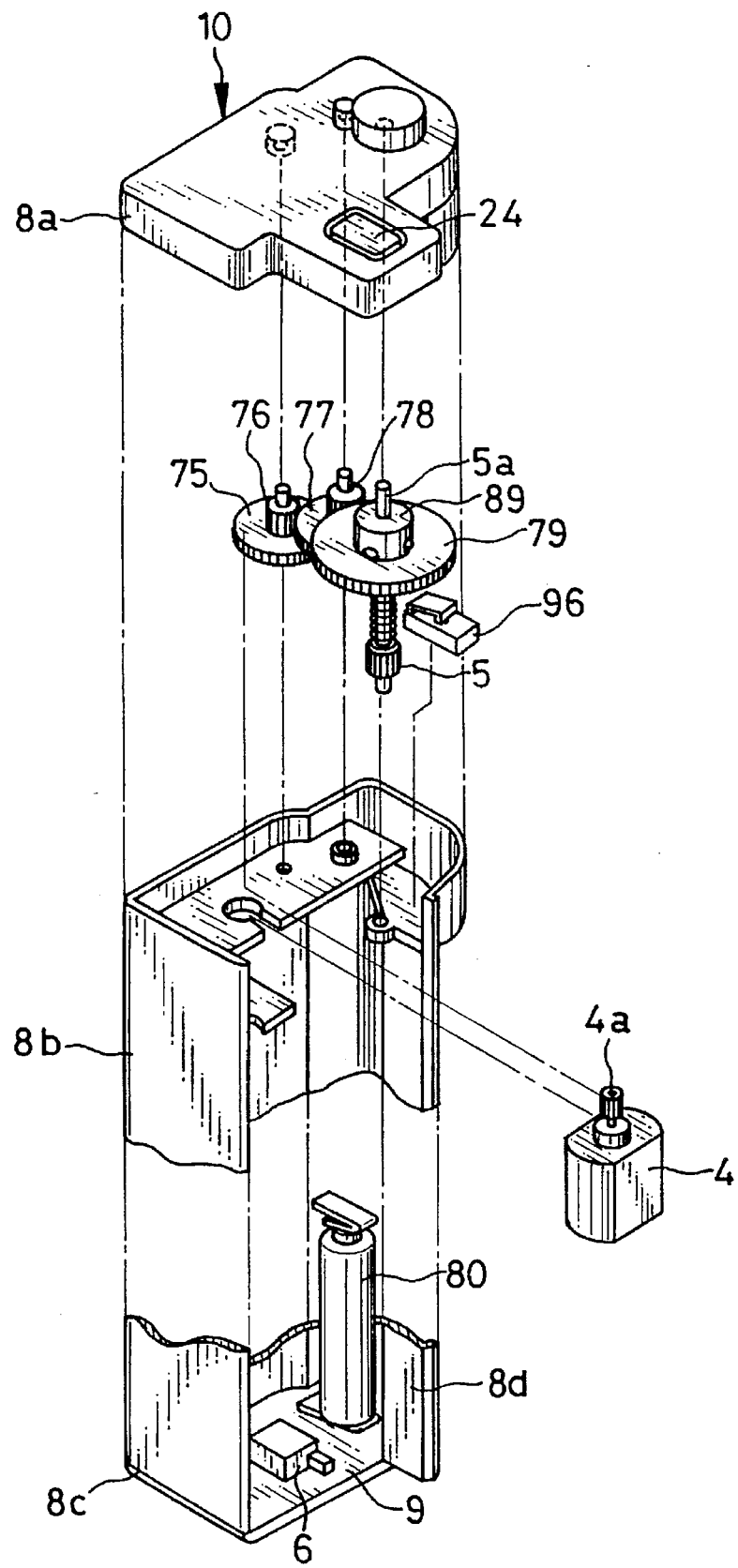
FIG. 7 is an exploded perspective view of the film winding unit shown in FIG. 1.

As shown in FIG. 7, the film winding unit 10 includes the coupling gear 5 which is adapted to gear into the teeth 16a of the film winding wheel 16 to drive it to rotate in the film winding direction, and a power transmission mechanism for transmitting driving power from the motor 4 to the coupling gear 5. The power transmission mechanism is constituted of a gear 4a fixedly mounted on a rotary shaft of the motor 4, a gear 75 meshing with the gear 4a, a gear 76 coaxially fixed to the gear 75, a gear 77 meshing with the gear 76, a gear 77 coaxially fixed to the gear 78, and a clutch gear 79 which meshes with the gear 78 and is disconnectably connected to the coupling gear 5, as is shown in more detail in FIG. 8. The gear trains of the power transmission mechanism supply the coupling gear 5 with necessary torque or decelerating rotational movement.

The film winding unit 10 also includes a battery 80, e.g., a size AA battery of 1.5 V, as a built-in power source for the motor 4. The battery 80 is exchangeable through the opening 9 when the film unit 11 is removed from the film winding unit 10. It is desirable to design the film winding unit 10 so as not to permit reversed loading of the battery 80. FIG. 7 does not show the plate spring 7 for clarity.

Figure 8:
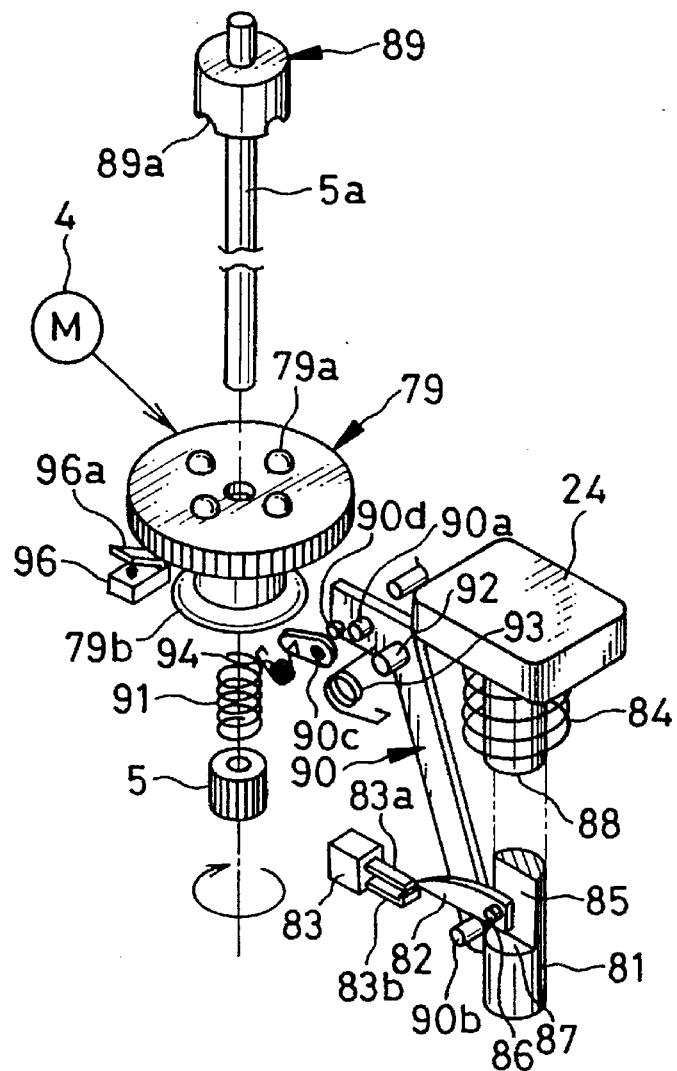
FIG. 8 is a perspective view of motor activating and inactivating devices of the film winding unit shown in FIG. 7.

The film winding unit 10 further includes a motor activating device which is adapted to activate the motor 4 only after the shutter release of the film unit 11. The motor activating device is constituted of a depressing rod 81, a motor activation switch 83, a switching lever 82 and a spring 84 for urging the depressing rod 81 to move upward, as is shown in FIG. 8. The depressing rod 81 is formed integrally with the release button 24 to protrude vertically from the bottom thereof. The release button 24 and the depressing rod 81 are movable longitudinal or axial directions thereof between a rest position where the release button 24 is usually located and the bottom end of the depressing rod 81 is separated a little from the shutter button 15, on one hand, and a shutter release position for depressing the shutter button 15. The motor activation switch 83 is turned ON when the switching lever 82 brings contact strips 83a and 83b into contact with each other. The depressing rod 81 has a stepped recess portion 85 and an axle 86 formed on a vertical or longitudinal wall of the stepped recess portion 85 to protrude in a horizontal or radial direction of the depressing rod 81. The switching lever is pivotally mounted on the axle 86.

Because the axle 86 is formed in a lower portion of the stepped recess portion 85, the switching lever 82 usually contacts a lower shoulder 87 of the stepped recess portion 85, so that the switching lever 82 cannot rotate farther in counterclockwise direction. Clockwise rotation of the switching lever 82 from this initial position is limited by an upper shoulder 88 of the stepped recess portion 85. Accordingly, when the depressing rod 81 moves from the rest position down to the shutter release position, the switching lever 82 gets over the contact strips 83a and 83b while keeping the switch 83 from being turned ON. Only when the depressing rod 81 moves from the shutter release position back to the rest position, the switching lever 82 pushes up the contact strip 83b to keep it in contact with the other contact strip 83a.

The film winding unit 10 further includes a clutch member which is incorporated into the power transmission device such that the clutch member disconnects the power transmission from the motor 4 to the coupling gear 5 when the film winding wheel 16 is locked in the above-described manner. In combination with the clutch member, a motor inactivating device is provided in the film winding unit 10. The motor inactivating device inactivates the motor 4 when it detects that the clutch member makes a slip that will occur each time the film winding wheel 16 is locked.

The clutch member and the motor inactivating device are constituted of a cylindrical member 89, the clutch gear 79, a canceling lever 90 and a spring 91. The cylindrical member 89 is fixedly mounted on an upper portion of a shaft 5a whose bottom end is fixedly secured to the coupling gear 5. The cylindrical member 89 has four semi-circular notches 89a spaced equally around the bottom edge thereof. The clutch gear 79 is provided with four hemispherical bosses 79a on the top surface thereof, which are engageable in the notches 89a of the cylindrical member 89. The clutch gear 79 is mounted on the shaft 5a rotatable relative to the shaft 5a. When the bosses 79a are engaged in the notches 89a of the cylindrical member 89, the rotational movement of the clutch gear 79 is transmitted to the coupling gear 5. The spring 91 urges the clutch gear 79 in a direction to engage the bosses 79a in the notches 89a.

The clutch gear 79 is movable between a power transmitting position and a disconnecting position. When the film winding wheel 16 is unlocked, the clutch gear 79 is placed in the power transmitting position, wherein the bosses 79a are engaged in the notches 89a to transmit the rotational movement of the motor 4 to the coupling gear 5. When the film winding wheel 16 is locked, the clutch gear 79 is placed in the disconnecting position, wherein the bosses 79a are disengaged from the notches 89a to disconnect the motor 4 from the coupling gear and, simultaneously, the clutch gear 79 pushes a movable contact 96a of a switch 96.

A ring 79b is integrally formed with the clutch gear 79 on the bottom side thereof. The canceling lever 90 is disposed in proximity of the ring 79b to be pivotal about an axle 92. The canceling lever 90 is urged by a spiral spring 93 to rotate in a clockwise direction. The canceling lever 90 is provided with pins 90a and 90b on upper and lower ends thereof, respectively.

A restraining lever 90c is pivotally fitted on the pin 90a and is urged by a spiral spring 94 in a counterclockwise direction. A stopper 90d is formed beside the pin 90a on the upper end of the canceling lever 90, such that the restraining lever 90c is usually brought into contact with the stopper 90d under the force of the spiral spring 94. In this position, a free end of the restraining lever 90c sticks a little under the ring 79b.

When the clutch gear 79 moves from the power transmitting position to the disconnecting position, the ring 79b pushes down the restraining lever 90c to rotate the canceling lever 90 counterclockwise. The counterclockwise rotation of the canceling lever 90 causes the pin 90b to push up the switching lever 82, so that the switch 83 is turned OFF. Thereafter, the ring 79b gets over the restraining lever 90c to move in a lower place than the restraining lever 90c, so that the canceling lever 90 moves back under the force of the spring 93. On the contrary, when the clutch gear 79 moves from the disconnecting position to the power transmitting position, the canceling lever 90 is not rotated counterclockwise, but only the restraining lever 90c is pushed up by the ring 79b to rotate clockwise about the axle 90a.

Figure 9:
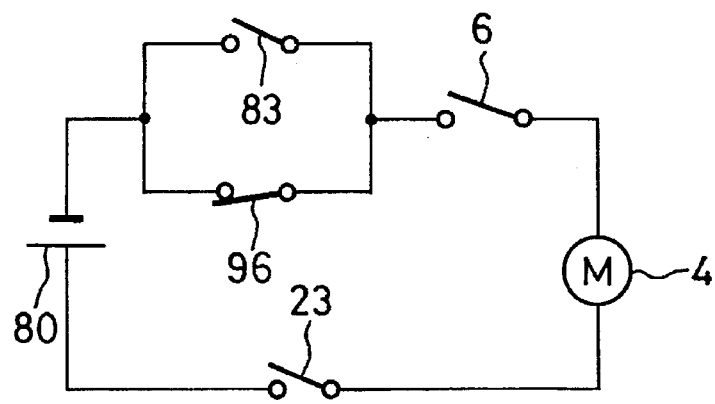
FIG. 9 is a circuit diagram of the film winding unit shown in FIG. 5.

The switch 96 is disposed below the clutch gear 79. The switch 96 is a break contact (or b-contact) switch which usually closes the circuit or stays in an ON position, and opens the circuit or shift in an OFF position only while the movable contact 96a is depressed. The switch 96 is connected in parallel with the switch 83 between the motor and the battery 80, as is shown in FIG. 9. The power switch 23 and the switch 6 are connected in series with each other as well as with the motor 4 and the battery 80.

The operation of the above embodiment will be described with reference to FIGS. 10A to 13B.

Figure 11A:
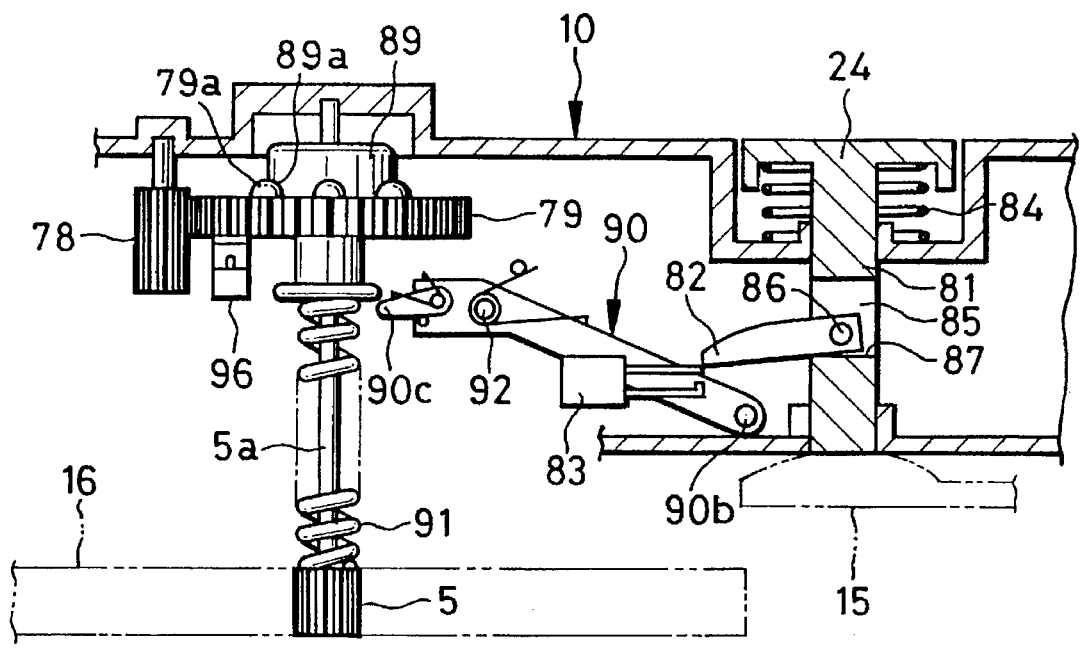
FIGS. 11A to 13B are explanatory views illustrating the operation of the film winding unit shown in FIG. 5.

The film winding unit 10 is in a condition as shown in FIG. 11A wherein the clutch gear 79 is power transmitting position, and the release button 24 is in the retracted position. Since the clutch gear 79 is in the power transmitting position, the b-contact switch 96 is in the ON position, while the other switches 6, 23 and 83 are in their OFF positions, as is shown in FIG. 9. On the other hand, the film unit 11 is in a condition wherein the first frame is not yet positioned behind the exposure opening, and hence, the film winding wheel 16 is not locked.

When the film winding unit 10 is attached to the film unit 11, the coupling gear 5 gears into the teeth 16a of the film winding wheel 16, and the release button 24 is disposed right above the shutter button 15 of the film unit 11. Also the switch 6 inside the opening 9 is contacted by the film unit 11 and is thus turned ON. Upon turning the power switch 23 ON after the attachment, the motor 4 is driven to rotate the film winding wheel 16 through the coupling gear 5 in the film winding direction.

As a result of the rotation of the film winding wheel 16, the sprocket wheel 57 rotates along with the advance of the photographic filmstrip 31a. When the sprocket wheel 57 makes one revolution, the claw 53a of the arresting lever 53 is engaged in the notch 55a of the cam member 55, so that the sprocket wheel 57 is stopped from rotating and the arresting lever 53 rotates slightly in the clockwise direction. As a result, the lock claw 53d is engaged in the teeth 16a to stop the film winding wheel 16 from rotating.

Since the film unit 11 is marketed to the purchasing public in a condition wherein the shutter actuating lever 49 is almost in the cocked position, the film winding wheel is locked soon after the initial film winding operation.

When the film winding wheel 16 is locked in this way, a large load is applied to the coupling gear 5, so that the bosses 79a of the clutch gear 79 slip out of the notches 89a to move the clutch gear 79 into the disconnecting position. As a result, the b-contact switch 96 is turned OFF to inactivate the motor 4. In this way, the first frame of the filmstrip 31a is positioned behind the exposure aperture of the film unit 11 at a time t1 in the timing charts shown in FIGS. 10A–10G. Indeed a tension is applied to the filmstrip 31a in a time period from the lock of the film winding wheel 16 to the inactivation of the motor 4. However, because the coupling gear 5 is decoupled from the clutch gear 79 when the motor 4 is inactivated, the coupling gear 5 is rotated slightly in a direction reverse to the film winding direction due to the tension on the filmstrip 31a, so that the filmstrip 31a is released from the tension.

Figure 11B:
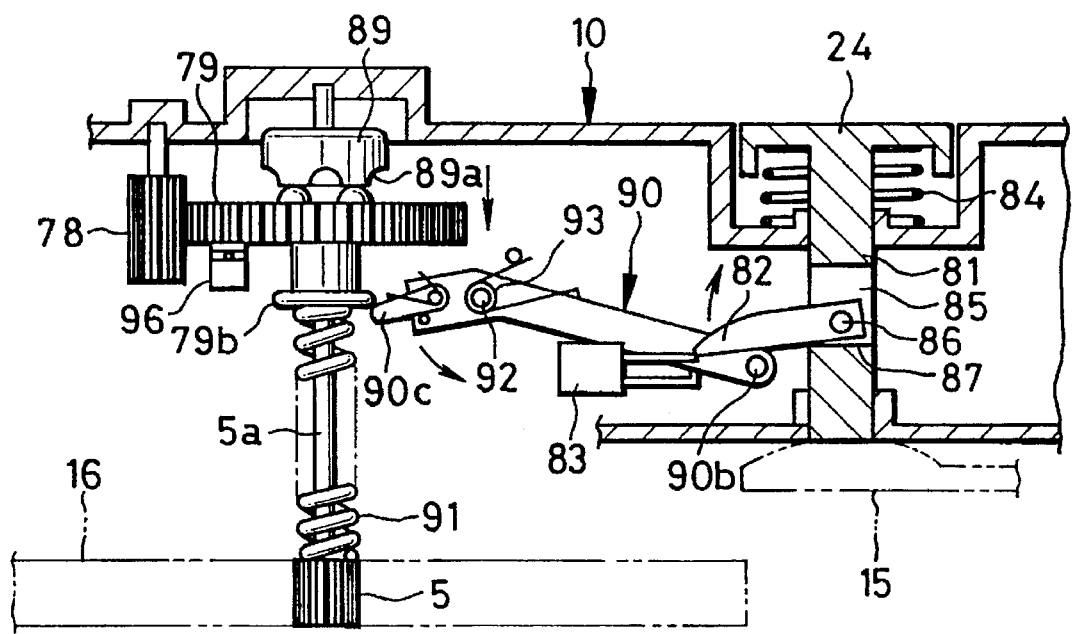
Figure 11C:
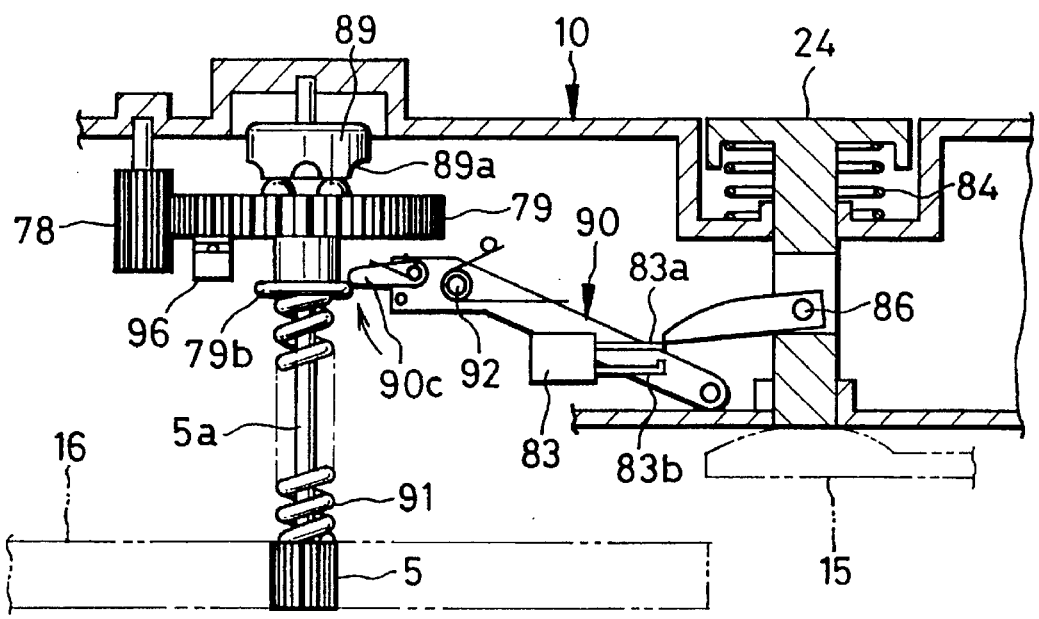

While the clutch gear 79 moves to the disconnecting position, the ring 79b pushes down the restraining lever 90c to rotate the canceling lever 90 counterclockwise, as is shown in FIG. 11B. When the clutch gear 79 reaches the disconnecting position, the ring 79b gets over the restraining lever 90c. Then, the canceling lever 90 returns to the initial position under the force of the spring 93, so that the restraining lever 90c is located above the ring 79b, as is shown in FIG. 11C.

Figure 12A:
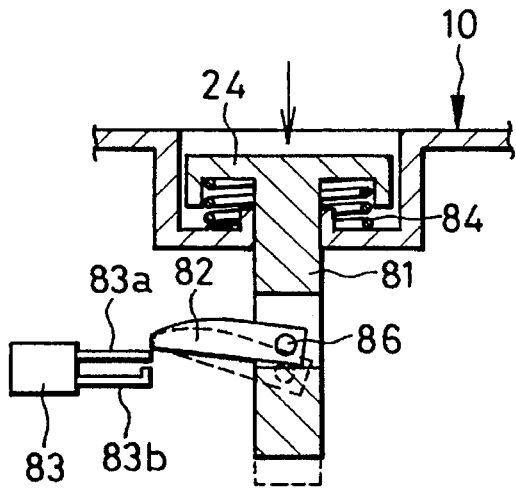
Figure 12B:
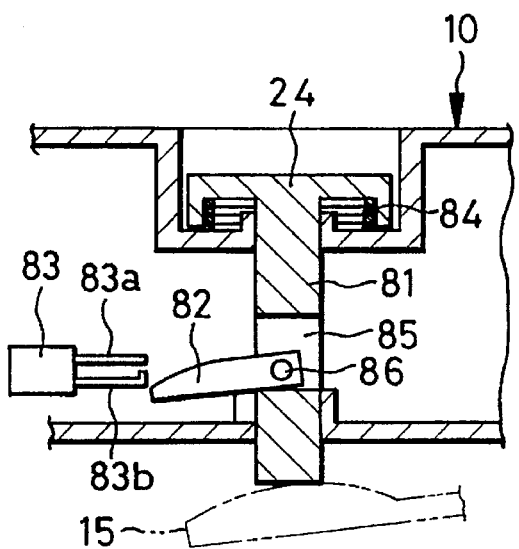

To execute an exposure, the release button 24 is depressed. Upon depression of the release button 24, the depressing rod 81 moves from the rest position to the shutter release position, while the switching lever 82 contacts against the contact strip 83a, to be rotated clockwise about the axle 86, as is shown in FIG. 12A. Thereafter, when the release button 24 reaches the shutter release position, the switching lever 82 gets over the contact strips 83a and 83b of the switch 83. Therefore, the switch 83 is not turned ON. In the shutter release position, as shown in FIG. 12B, the shutter button 15 is depressed by the depressing rod 81.

With the depression of the shutter button 15, the rod 15a formed on the bottom of the shutter button 15 pushes the downward arm 53b of the arresting lever 53 to rotate the arresting lever 53 counterclockwise. As a result, the projection 53c of the arresting lever 53 is removed from the upward projection 49c of the shutter actuating lever 49, so that the shutter actuating lever 49 rapidly rotates counterclockwise under the force of the spring 52, while striking the claw 42a of the shutter blade 42 at the striking stick 49e, to make an exposure. Simultaneously with the counterclockwise rotation of the arresting lever 53, the lock claw 53d is disengaged from the teeth 16a of the film winding wheel 16 to unlock the film winding wheel 16, and the claw 53a is removed from the notch 55a of the cam member 55 to permit rotating the sprocket wheel 57. Since the filmstrip 31a is not in tension, the filmstrip 31a will not be deviated even when the film winding wheel 16 is set free.

Figure 12C:
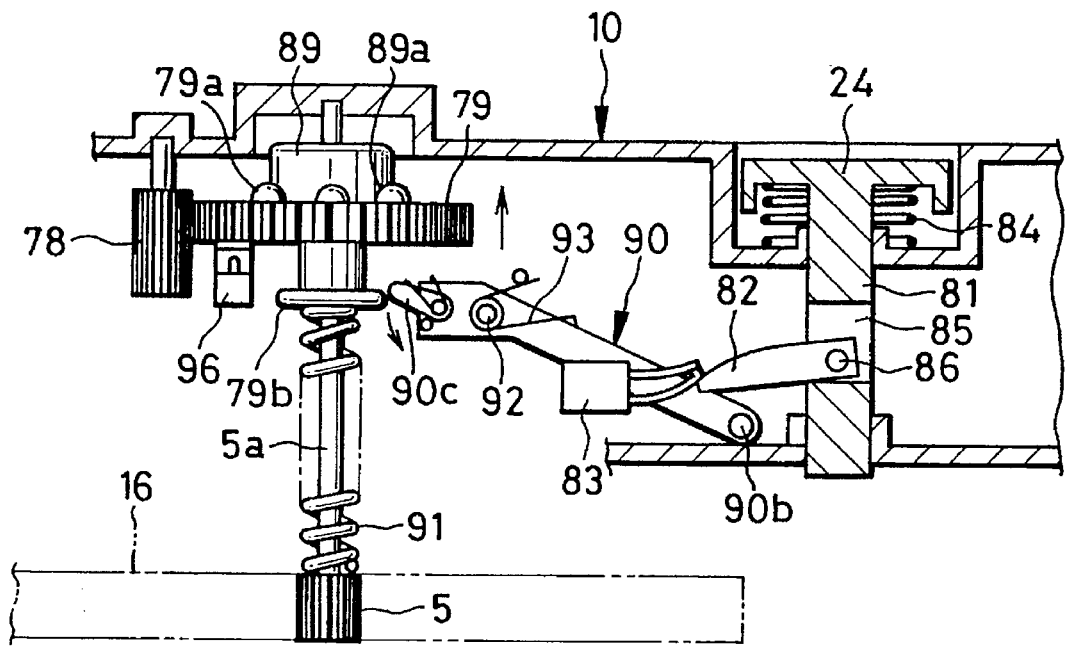

When the depressing operation of the release button 24 is terminated, the depressing rod 81 jumps back to the rest position under the force of the spring 84, while the switching lever 82 pushes up the contact strip 83b of the switch 83 to bring the strip 83b into contact with the contact strip 83a, as is shown in FIG. 12C. Thus, the switch 83 is turned ON to drive the motor 4. Rotational movement of the motor 4 is transmitted to the clutch gear 79 through the gears 75 to 78, and brings the bosses 79a back into engagement with the notches 89a, so that the coupling gear 5 is also rotated by the motor 4. Since the film winding wheel 16 and the sprocket wheel 57 are unlocked, the rotation of the coupling gear 5 causes the film winding wheel 16 to rotate in the film winding direction.

Figure 12D:
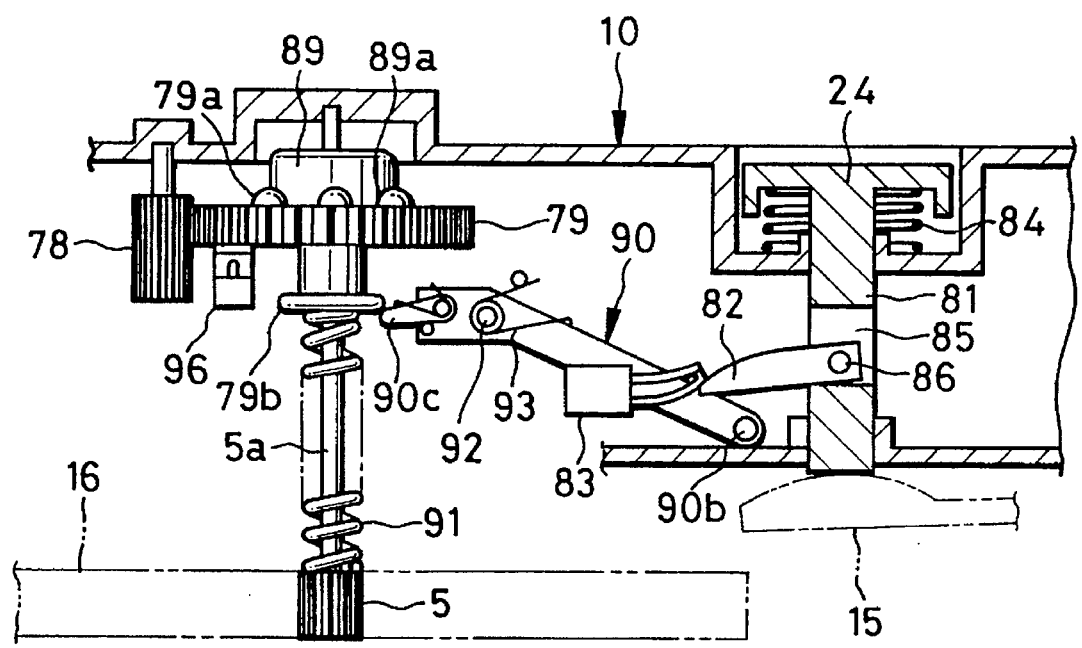

While the clutch gear 79 moves to the power transmitting position, the b-contact switch 96 is turned ON, and the ring 79b pushes up the restraining lever 90c. However, because the restraining lever 90c is rotated about the axle 90a in the clockwise direction to move away from the ring 79b, the canceling lever 90 is not rotated at that time. When the clutch gear 79 reaches the power transmitting position, the ring 79b passes over the restraining lever 90c to move downward from the restraining lever 90c, so that the restraining lever 90c is returned under the force of the spring 94, as shown in FIG. 12D, wherein the switching lever 82 keeps the switch 83 ON.

Figure 13A:
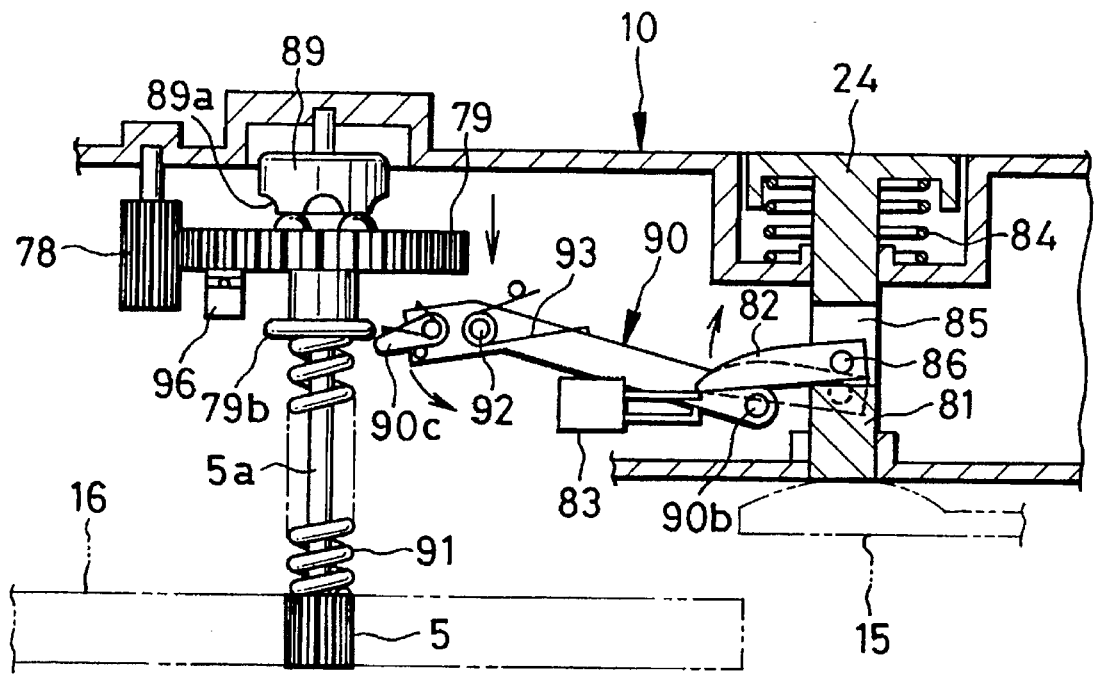

When the filmstrip 31a is transported by one-frame amount, the film winding wheel 16 is locked in the same way as above, for example, at a time t2 in FIGS. 10A–10G. Then, a load is applied to the coupling gear 5, so that the clutch gear 79 moves into the disconnecting position, as is shown in FIG. 13A. Thus, the b-contact switch 96 is turned OFF.

Also the ring 79b depresses the restraining lever 90c to cause the canceling lever 90 to rotate counterclockwise, along with the movement of the clutch gear 79 to the disconnecting position. At that time, the pin 90b pushes up the switching lever 82 to rotate it clockwise. Thereby, the switching lever 82 gets over the contact strips 83a and 83b to turn the switch 83 OFF, terminating to drive the motor 4. Thereafter, the depressing rod 81 and the release button 24 are returned to the rest position under the force of the spring 84.

Figure 13B:
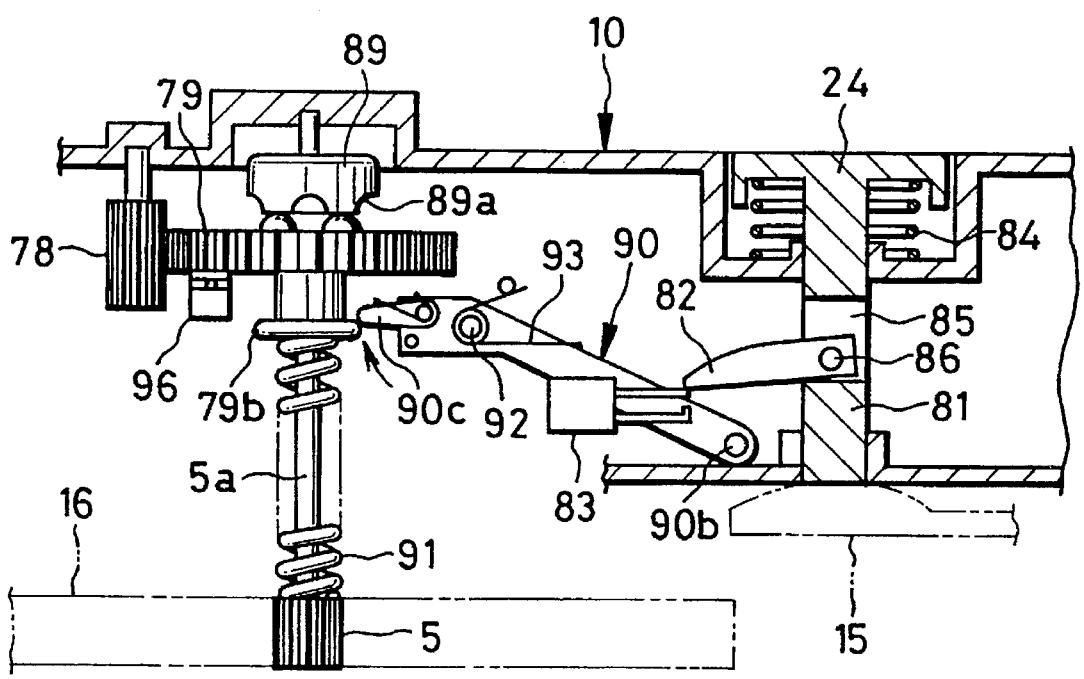

Thereafter when the ring 79b gets over the restraining lever 90c, the canceling lever 90 is rotated clockwise under the force of the spring 93 to place the restraining lever 90c above the ring 79c, as is shown in FIG. 13B.

The same operation as above is repeated until the last frame of the filmstrip 31a has been exposed at a time t3 in FIGS. 10A–10G. Thereafter, the motor 4 is driven to wind up the entire length of the filmstrip 31a into the container 31b. Since the last frame is arranged such that the length of a portion of the filmstrip 31a that remains unexposed behind the last frame will be shorter than the length of one frame, the remaining portion of the filmstrip 31a is entirely wound into the container 31b by rotating the film winding wheel 16 less amount than that is necessary for one-frame advance. Accordingly, after the last exposure, the arresting lever 53 is not actuated to lock the film winding wheel 16, and the motor 4 continues to be driven. It is easy for any photographer to realize that the motor 4 keeps rotating for a long time. If the photographer reads the instruction printed on the outer surface of the main portion 8b of the housing 8 of the film winding unit 10, and/or reads the frame counter dial 50 through the frame counter window 21 at that time, the photographer will realize that the filmstrip 31a is completely wound up, and that it is necessary to turn the power switch 23 OFF.

After the motor 4 is thus inactivated, the film unit 11 can be safely removed from the film winding unit 10. The removed film unit 11 may be forwarded to a photofinisher, and an unexposed film unit 11 can be attached to the film winding unit 10. Then, the same operation as above will be repeated for photographing.

Since the switch 83 for activating the motor 4 will not be turned ON even if the release button 24 continues to be depressed, but the switch 83 is turned ON only while the release button 24 returns to the initial or rest position, the filmstrip 31a will not be transported until the exposure is completed. If the film winding unit 10 should accidentally separate from the film unit 11 while the motor 4 is being driven, the switch 6 is turned OFF to stop the motor 4 from rotating. Therefore, the film winding unit 10 according to the above embodiment is reliable and safe.

Figure 14:
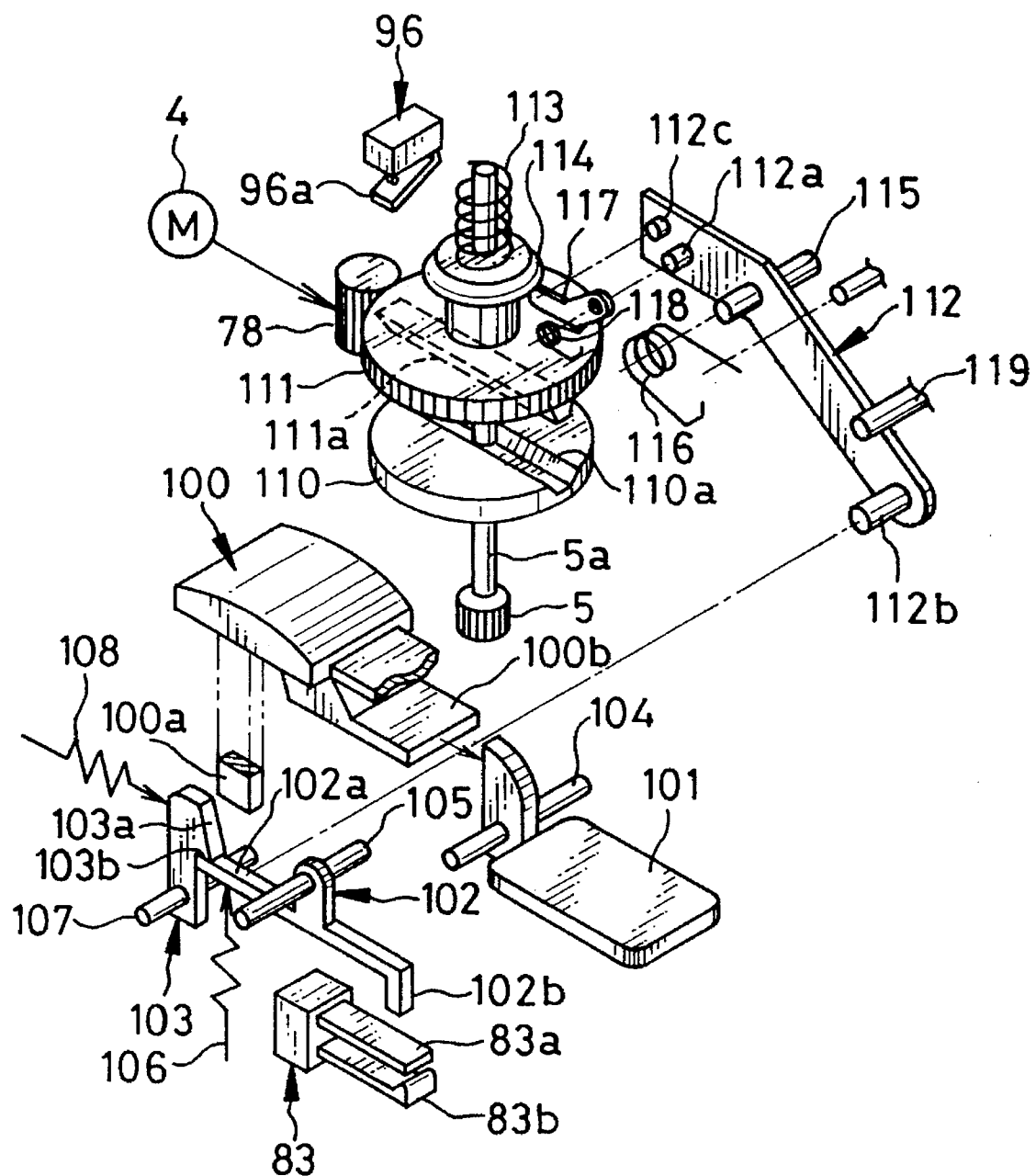
FIG. 14 is an explanatory perspective view of motor activating and inactivating devices according to another embodiment of the invention.

FIGS. 14 to 16 show a motor activating device, a clutch member and a motor inactivating device of a film winding unit according to another embodiment of the invention. The second embodiment may be equivalent to the above-described first embodiment concerning other elements of the film winding unit than those designated by different reference numerals in FIGS. 14 to 16. The motor activating device is constituted of a resilient release button 100 formed integrally with a housing 8 of the film unit, a depressing lever 101 for depressing the shutter button 15 of the film unit 11 in cooperation with the release button 100, a switch 83, a switching lever 102 which turns the switch 83 ON after the completion of the exposure, and a holding lever 103 for holding the depressing lever 101.

Figure 15A:
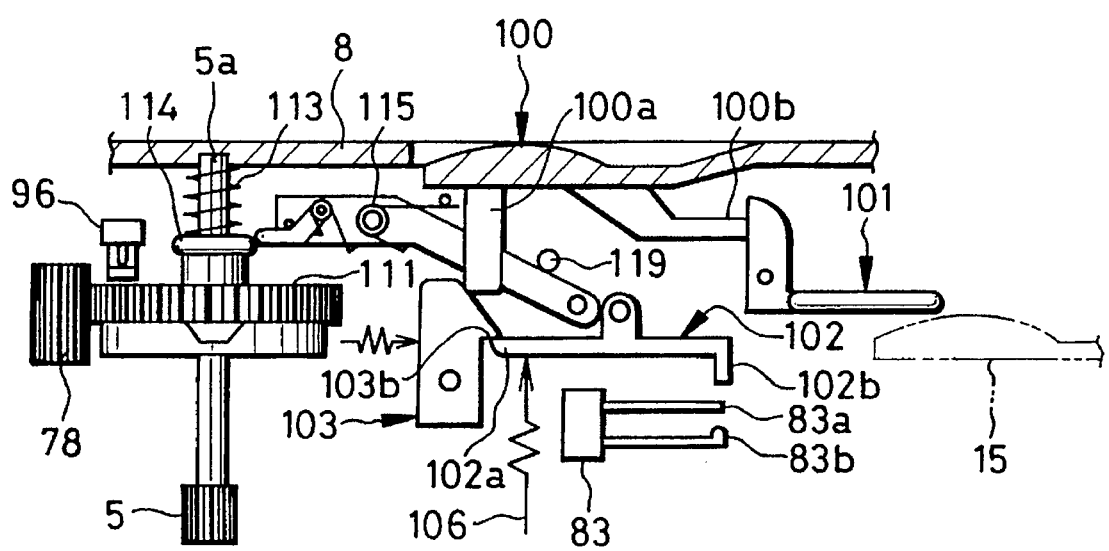
FIGS. 15A to 16C are explanatory view illustrating the operation of the embodiment shown in FIG. 14.
Figure 15B:
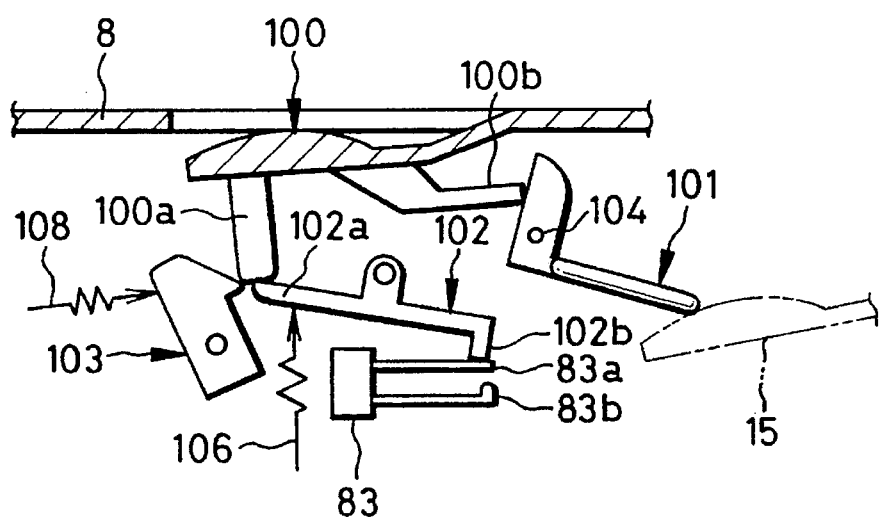

The release button 100 has a leg 100b integrally formed on the bottom thereof, and is movable from a rest or initial position wherein the shutter button 15 is not depressed, into a shutter release position when being depressed. In the shutter release position, the release button 100 pushes at its leg 100b the depressing lever 101 so as to rotate clockwise about an axle 104. Thereby, the depressing lever 101 depresses the shutter button 15, as is shown in FIGS. 15A and 15B. The switching lever 102 is rotatable about an axle 105 and is urged by a spring 106 to rotate clockwise. The holding lever 103 is disposed below the release button 100, so as to be rotatable about an axle 107. The holding lever 103 has a hook 103b which is kept engaged with an end 102a of the switching lever 102 under a force of a spring 108 when the release button 100 is in the rest position. A slope 103a is formed atop the hook 103b.

Figure 15C:
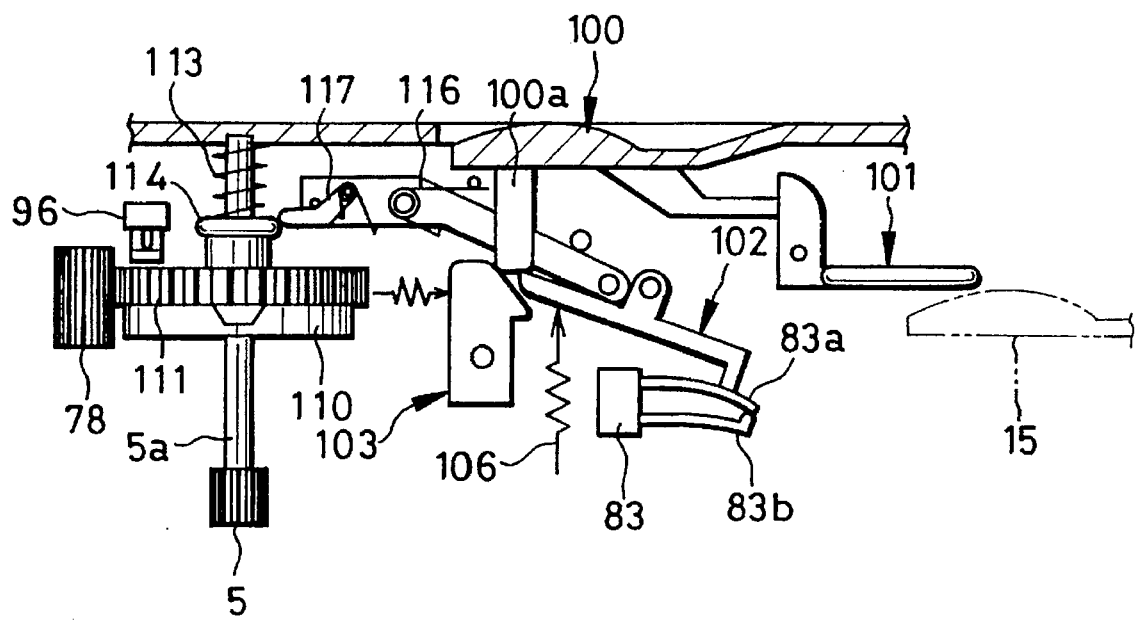

A limiting rod 100a is formed on the bottom of the release button 100 integrally therewith. When the release button 100 is depressed to push the limiting rod 100a against the slope 103a, the engagement between the holding lever 103 and the switching lever 102 is released, and the end 102a of the switching lever 102 is brought into contact with the limiting rod 100a, as is shown in FIG. 15B. In this condition, a second end 102b of the switching lever 102 does not push down a contact strip 83a of the switch 83. Thereafter, when the release button 100 is moved from the shutter release position back to the rest position, the limiting rod 100a allows the switching lever 102 to rotate further in the clockwise direction to bring the contact strip 83a into contact with another contact strip 83b of the switch 83, as is shown in FIG. 15C. Thus, the switch 83 is turned ON after the exposure is completed.

The clutch member and the motor inactivating device are constituted of a disc 110, a clutch gear 111, a canceling gear 112, a spring 113 and a b-contact switch 96. The disc 110 is fixedly mounted on an axle 5a, and has a trapezoidal groove 110a formed integrally on the top thereof. The clutch gear 111 has a trapezoidal projection 111a formed integrally on the bottom thereof so as to be engageable in the trapezoidal groove 110a. The clutch gear 111 is mounted on the axle 5a to be rotatable thereon. The spring 113 urges the clutch gear 111 toward the disc 110.

The clutch gear 111 is movable between a power transmitting position and a disconnecting position. When a film winding wheel 16 is unlocked, the clutch gear 111 is moved in the power transmitting position wherein the projection 111a is engaged in the groove 110a to transmit the movement of a motor 4 to a coupling gear 5. When the film winding wheel 16 is locked, the clutch gear 111 is moved in the disconnecting position wherein the projection 111a is disengaged from the groove 110a to disconnect the power transmission from the motor 4 to the coupling gear 5 and also depress a movable contact 96a of the b-contact switch 96 to turn the same OFF.

A ring 114 is integrally formed on the top of the clutch gear 111. The canceling lever 112 is disposed in proximity of the ring 114 so as to be rotatable about an axle 115. The canceling lever 112 is urged by a spring 116 to rotate counterclockwise, and is stopped by a stopper 119.

The canceling lever 112 has an axle 112a and a pin 112b disposed on opposite ends thereof. The pin 112b is inserted under the first end 102a of the switching lever 102. The axle 112a pivotally mounts a restraining lever 117 thereon. The restraining lever 117 is usually stopped by a stopper pin 112c while being urged by a spring 118 to rotate clockwise. In this usual condition, a tip of the restraining lever 117 sticks a little under the ring 114.

The second embodiment as shown in FIG. 14 operates as follows:

When the release button 100, which is usually located in the initial or rest position as shown in FIG. 15A, is depressed, the limiting rod 100a contacts against the slope 103a of the holding lever 103 to rotate the lever 103 counterclockwise. Thereby, the first end 102a of the switching lever 102 is disengaged from the hook 103b to permit the switching lever 102 to rotate clockwise under the force of the spring 106. However, because the first end 102a stops against the limiting rod 100a, the switching lever 102 is maintained in a position as shown in FIG. 15B.

Thereafter when the release button 100 reaches the shutter release position, the depressing lever 101 depresses the shutter button 15 of the film unit 11 to execute an exposure. Thereafter, along with the release button 100 resiliently moving back to the rest position, the switching lever 102 rotates clockwise under the force of the spring 106. When the release button 100 reaches the rest position, the switching lever 102 turns the switch 83 ON, as is shown in FIG. 15C, to activate the motor 4.

Figure 16A:
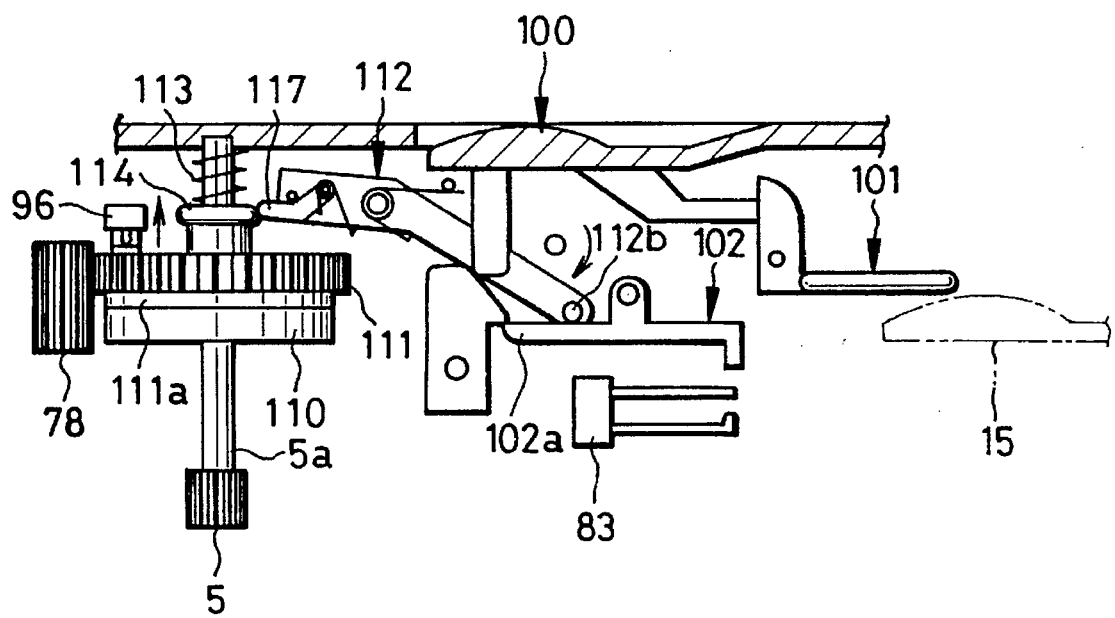

When the filmstrip 31a has been transported by one frame, the film winding wheel 16 is locked in the same way as above. Then, a load is applied to the coupling gear 5, so that the clutch gear 111 is shifted from the power transmitting position upward to the disconnecting position. Since the ring 114 moves together with the clutch gear 111, the restraining lever 117 is pushed up by the ring 114 to cause the canceling lever 112 to rotate clockwise, during the upward movement of the clutch gear 111. The clockwise rotation of the canceling lever 112 causes the pin 112b to push down the switching lever 102 in counterclockwise direction. As a result, the switching lever 102 turns the switch 83 OFF, as is shown in FIG. 16A.

Figure 16B:
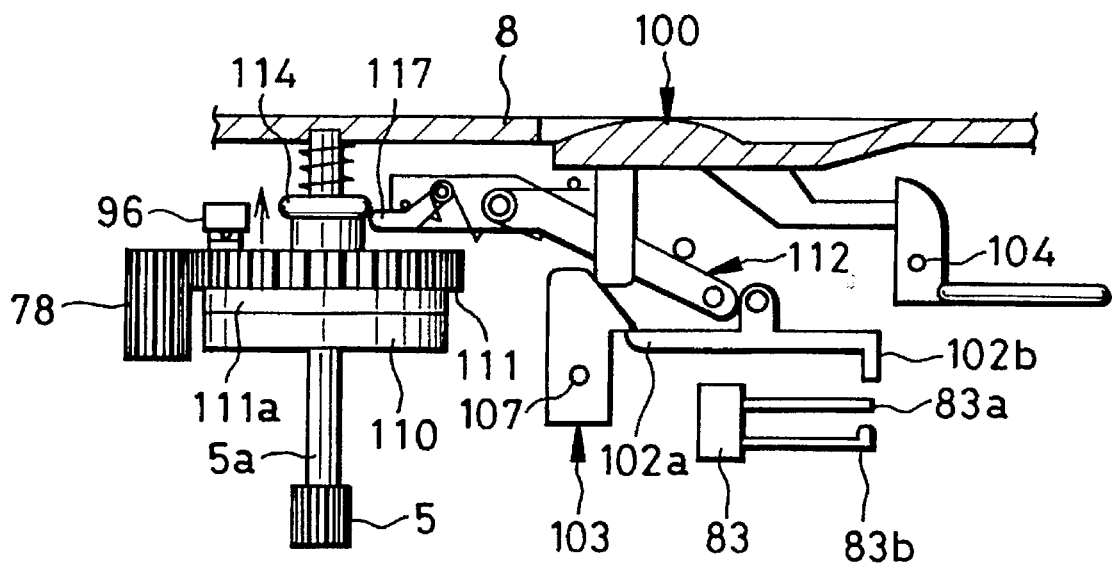

In the disconnecting position, the clutch gear 111 pushes the movable contact 96a of the b-contact switch 96 to turn it OFF, so that the motor 4 is inactivated. Since the ring 114 gets over the restraining lever 117 in the disconnecting position, the restraining lever 117 is disposed under the ring 114 and, simultaneously, the canceling lever 112 is returned to the initial position under the force of the spring 116, as is shown in FIG. 16B.

Figure 16C:
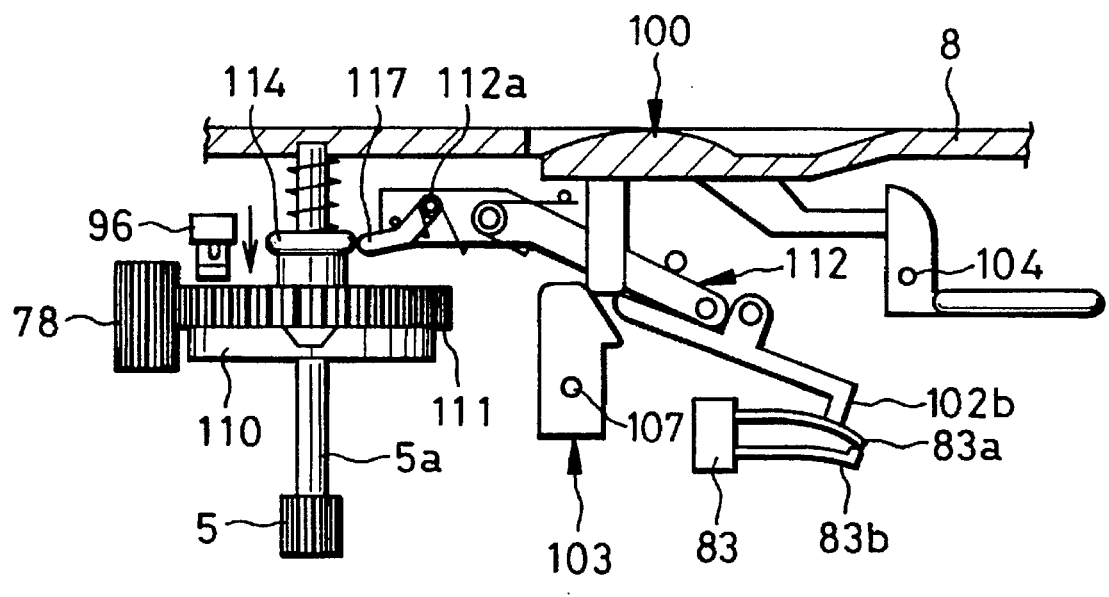

When the next exposure has been made, and the film winding wheel 16 is unlocked, the motor 4 is activated in the above-described way. As a result, the clutch gear 111 is shifted from the disconnecting position downward to the power transmitting position to transmit the movement of the motor 4 to the coupling gear 5, as is shown in FIG. 16C. Simultaneously, the ring 114 moving together with the clutch gear 111 pushes down the restraining lever 117. At that time, however, the restraining lever 117 will rotate counterclockwise about the axle 112a to move away from the ring 114, so that the canceling lever 112 will not be rotated counterclockwise. Therefore, the switch 83 is not turned OFF at that time. To avoid complication, the springs 106, 108 and 113 are omitted from FIGS. 16A to 16C.

Figure 17:
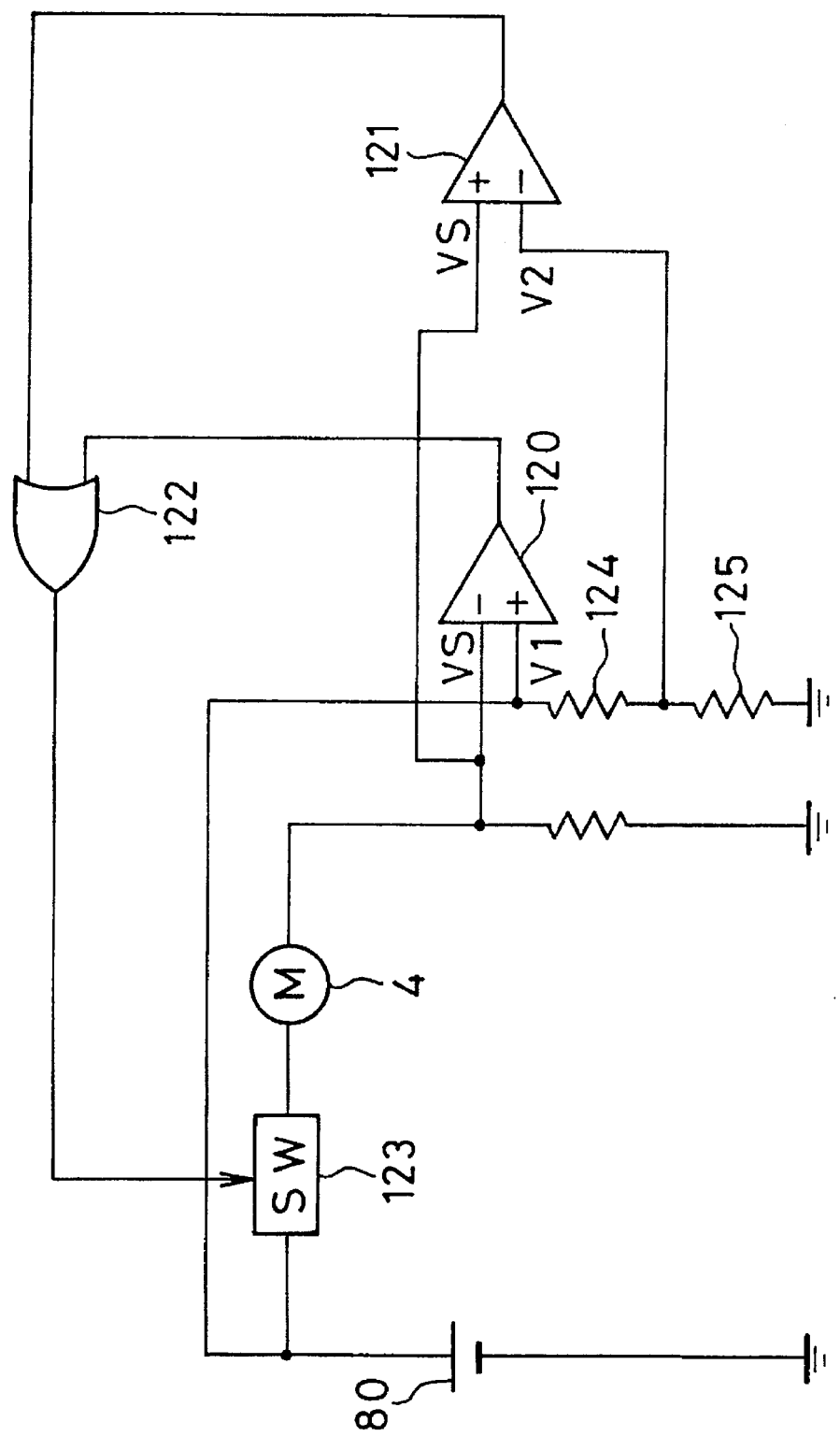
FIG. 17 is a circuit diagram of an motor inactivating device according to another embodiment of the invention.
Figure 18:
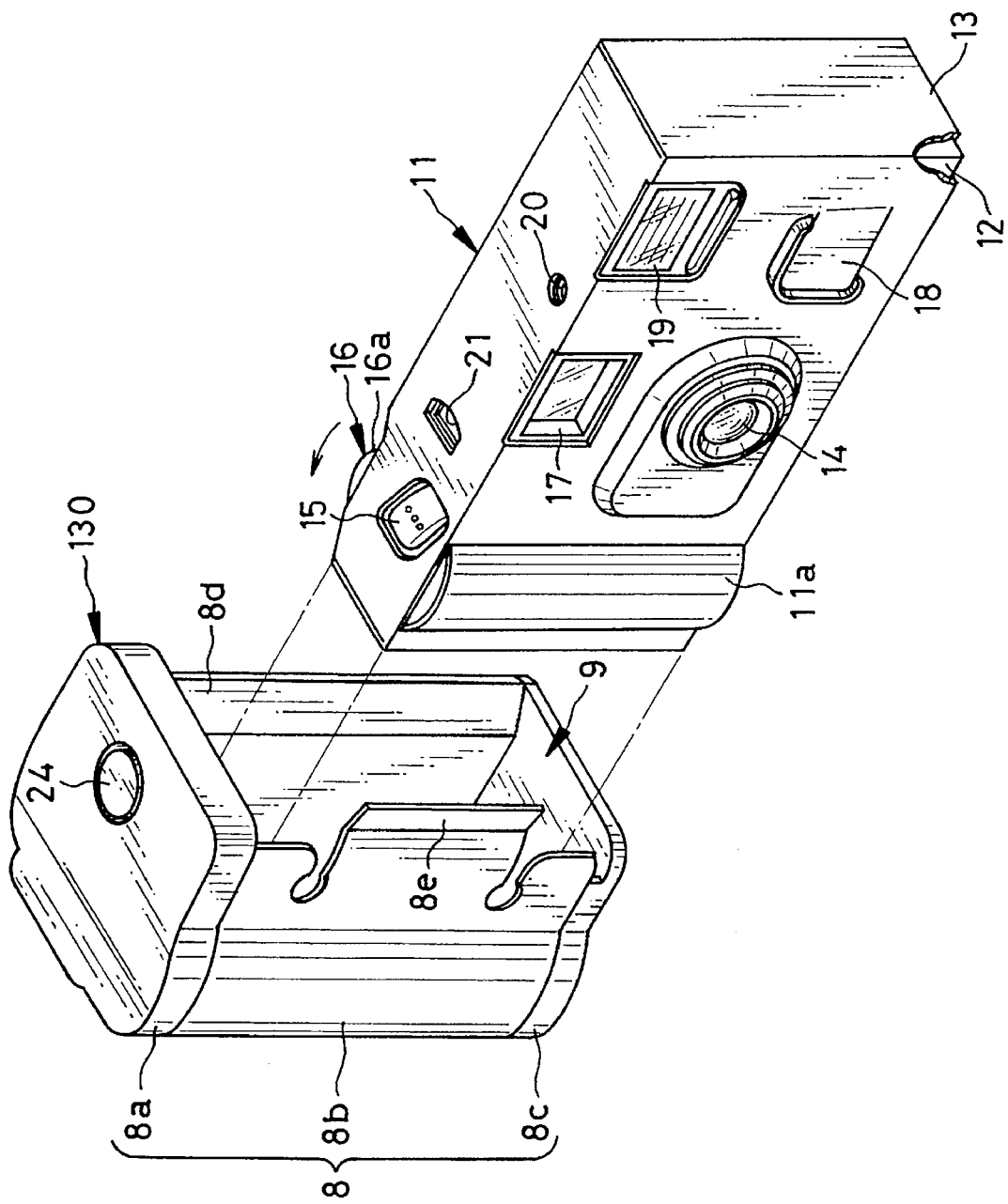
FIG. 18 is a perspective view showing the appearance of a film winding unit according to another embodiment of the invention, which can wind the filmstrip by operating a release button only.

FIG. 17 shows another embodiment of motor inactivating device which measures current through the motor 4 and inactivates the motor 4 upon a large current which flows through the motor 4 when a large load is applied to the motor 4 as a result of locking of the film advancing wheel 16, like as the above-described conventional motor inactivating device. However, while the conventional device cannot automatically stop driving the motor after the last frame exposure, the embodiment shown in FIG. 17 can automatically stop driving the motor 4 when the filmstrip 31a is completely wound into the container 31b, making use of the fact that the load on the motor 4 applied after the completion of winding-up of the filmstrip 31a into the container 31b is less than that applied during one-frame winding of the filmstrip 31a.

Specifically, the voltage from the battery 80 is divided into first and second reference voltages V1 and V2 by a pair of resistances 124 and 125, and the first and the second reference voltages V1 and V2 are applied to a non-inverting input of a comparator 120 and an inverting input of a comparator 121, respectively. Another input of either comparator is supplied with a voltage VS which is proportional to the current flows through the motor 4. Outputs of the comparators 120 and 121 are connected to a switch 123 through an OR-gate 122, so that the switch 123 is turned OFF when one of the comparators 120 and 121 outputs a high level signal. The switch 123 is a self-holding switch which is adapted to be turned ON after each shutter release operation of the film unit 11, and cannot change its switching condition by itself.

The reference voltage V1 is given as an upper limit of the voltage VS, and the reference voltage V2 is given as a lower limit of the voltage VS, such that the voltage VS is normally maintained within the range between the reference voltages V1 and V2. When the voltage VS goes above the upper reference voltage V1, that is, when an excessively large current flows through the motor 4, it means that the film winding wheel 16 is locked. On the other hand, when the voltage VS goes below the lower reference voltage V2, that is, when an excessively small current flows through the motor 4, it means that the entire length of the filmstrip 31a has been wound into the container 31b. The coupling gear 5, the clutch member and the power transmission mechanism as shown in FIGS. 1 to 8 may be preferably used in combination with the embodiment shown in FIG. 17.

According to another embodiment of motor inactivating device, it is possible to measure rotational angle per unit time of an output shaft of the motor 4 to inactivate the motor 4 with reference to the rotational angle per unit time, because it varies depending on the load on the motor 4. For this embodiment, it is preferable to mount the output shaft with a wheel having several slits, and detect the slits by a photosensor that detects light passing through the slits and outputs a pulse for each detection. By comparing the frequency of the pulses with a reference value in a CPU or the like, it is possible to determine if the film winding wheel is locked or unlocked, as well as if the filmstrip 31a is entirely wound into the container 31b, in order to inactivate the motor 4 in those cases.

FIGS. 18 to 24 shows a film winding unit 130 according to another embodiment of the invention, which has no such power switch as the power switch 23 of the film winding unit 10, and is capable of winding the filmstrip 31a upon actuation of a release button 24 only. A motor 4 of the film winding unit 130 is automatically stopped when the film unit 11 is detached from the film winding unit 130 after the last frame of the filmstrip 31a is exposed. Also, the plate spring 7 as used in the film winding unit 11 is replaced by a resilient segment 8e which is formed integrally with a main portion 8b of a housing 8 in the film winding unit 130.

Figure 19:
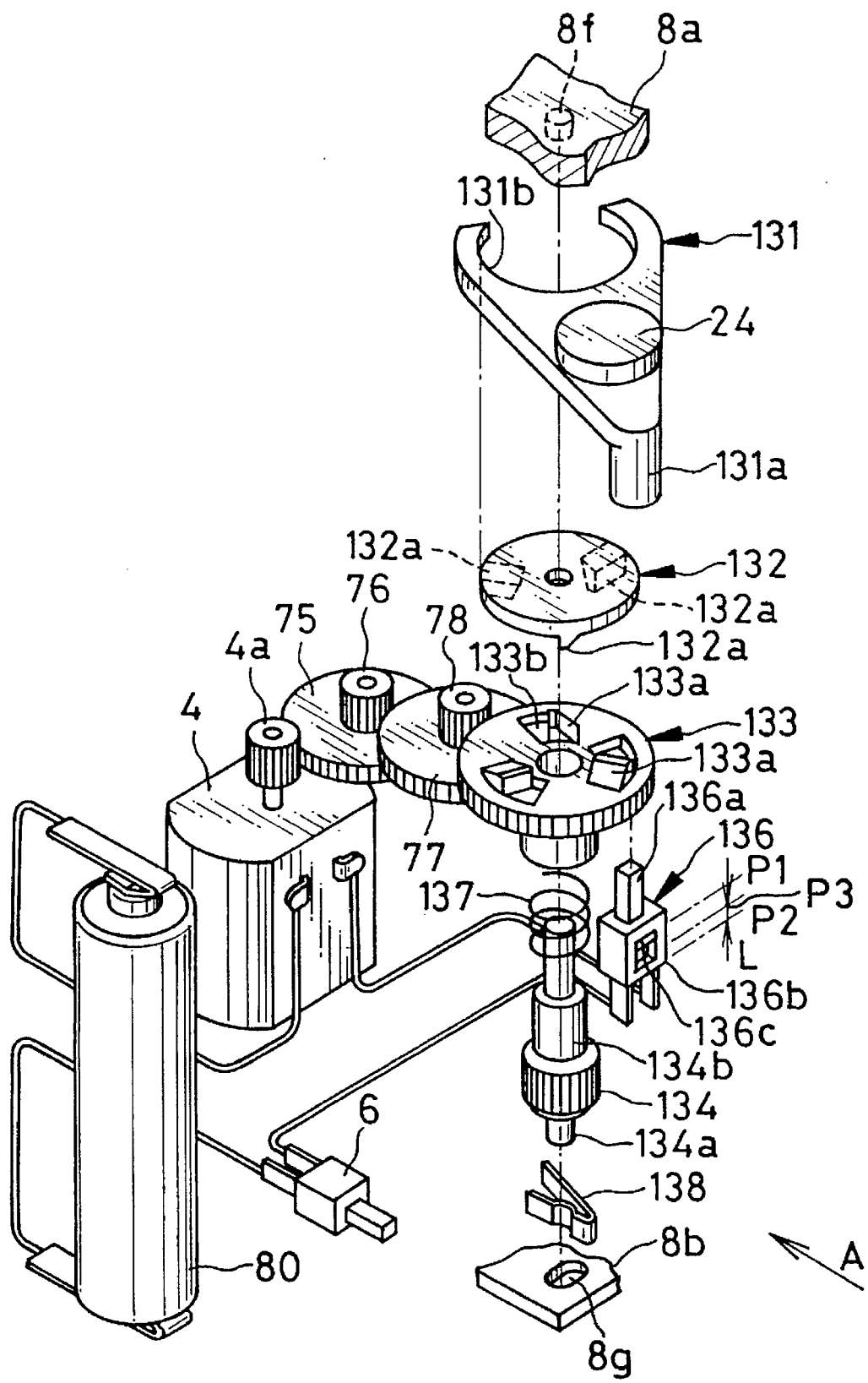
FIG. 19 is a perspective view showing the internal construction of the film winding unit shown in FIG. 18.
Figure 20:
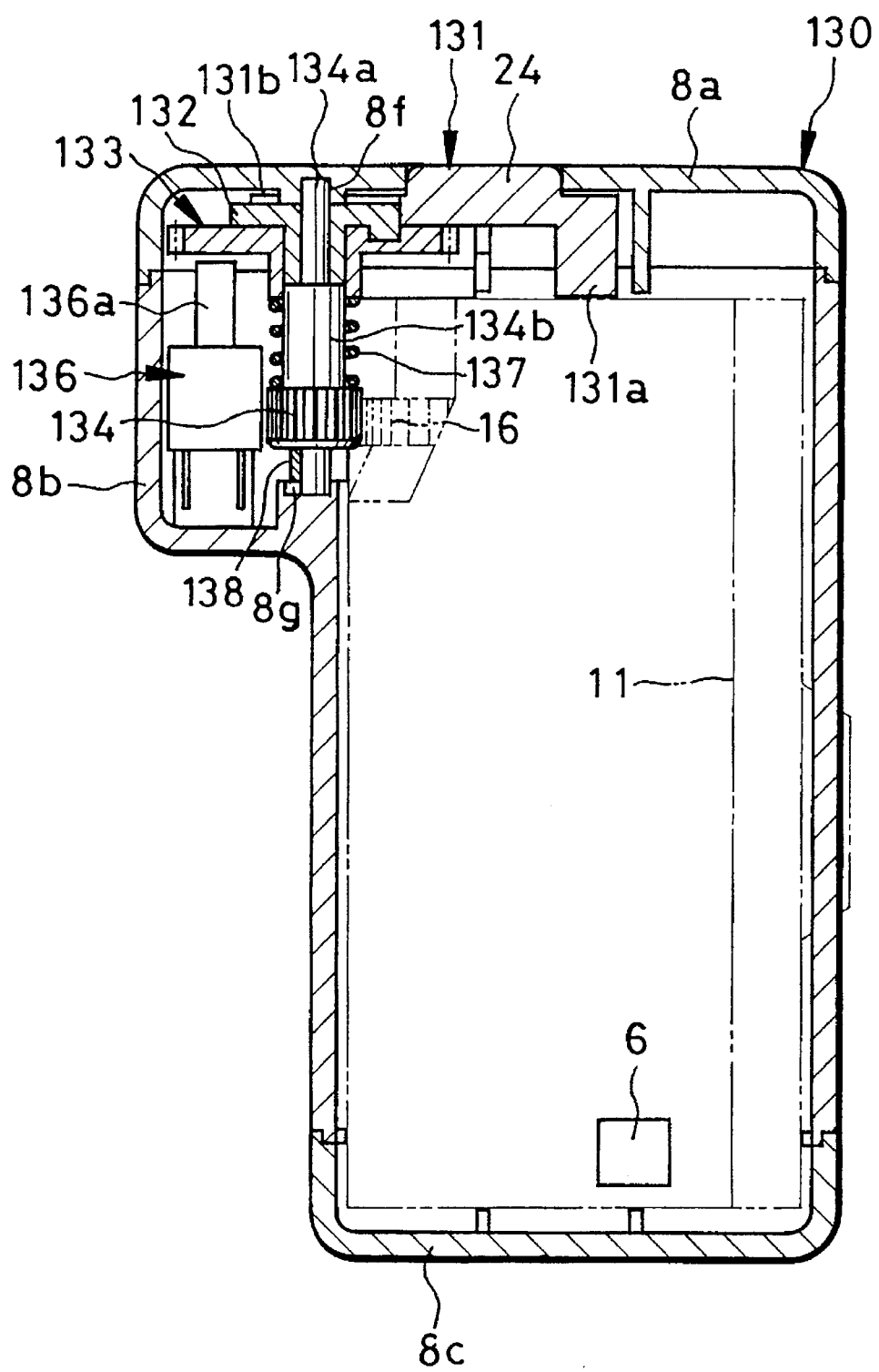
FIG. 20 is a vertical sectional view of the film winding unit shown in FIG. 18, illustrating an initial position.

The internal construction of the film winding unit 130 is shown in FIGS. 19 and 20. A shutter release plate 131 and a switch 136 constitute a motor activating device, while a clutch gear 133 and the switch 136 constitute a motor inactivating device. The clutch gear 133 and a disc 132 constitutes a clutch member. In this embodiment, the switch 136 is commonly used both for activating and for inactivating the motor 4, so that the cost of parts is reduced.

A coupling gear 134, which is brought into mesh with the film winding wheel 16 of the film unit 11, has an axle 134a formed integrally therewith at the rotational center thereof. The axle 134a is pivoted in a bearing portion 8f and 8g formed in inner wall portions of the housing 8. An axle portion 134b having a larger diameter than the axle 134a is coaxially formed around the axle 134a atop the coupling gear 134. The axle portion 134b mounts the clutch gear 133 to be rotatable and axially movable thereon.

The disc 132 is force fitted on the axle 134a between the axle portion 8f and the bearing portion 134b. The disc 132 has three claws 132a formed integrally on the bottom thereof, while the clutch gear 133 has three claws 133a formed integrally on the top thereof so as to be engageable with the claws 132a. When these claws 132a and 133a are engaged with each other, the rotational movement of the motor 4 is transmitted to the coupling gear 134. A spring 137 urges the clutch gear 133 toward the disc 132. Three recessed portion 133b are formed before the respective claws 133a for secure engagement between the claws 132a and 133a.

The clutch gear 133 is moved into a power transmitting position when the film winding wheel 16 is unlocked to permit being rotated, wherein the claws 133a and 132a are engaged to transmit the movement of the motor 4 to the coupling gear 134. The clutch gear 133 is moved into a disconnecting position due to a large load which is applied when the film winding wheel 16 is locked, wherein the claws 132a and 133a are disengaged to disconnect the motor 4 from the coupling gear 134. The switch 136 is disposed under the clutch gear 133.

The shutter release plate 131 is disposed above the clutch gear 133. The shutter release plate 131 has the release button 24 integrally formed on the top thereof, and a depressing pin 131a for depressing the shutter button 15 of the film unit 11 is also formed integrally on one side of the release button 24 to protrude downward. On the opposite side of the release button 24, there is formed an inlet 131b in the shutter release plate 131 so as to slidably accept the disc 132 therein. When the release button 24 is depressed, the rim of the inlet 131b slides on the periphery of the disc 132 to guide the shutter release plate 131 along the axle 134. Then, the depressing pin 131a depresses the shutter button 15 and, at the same time, the rim of the inlet 131b depresses the clutch gear 133 to move it into the disconnecting position.

The switch 136 is a push-pull switch, so that the switch 36 is in ON position (circuit closing position) when its switching rod 136a protrudes to the outside of its housing 136b as shown in FIG. 19. The switching rod 136a is pushed into the housing 136b by the clutch gear 133 moving into the disconnecting position. A guide 136c which is fitted in a straight groove is slidable inside the housing 136b along with the switching rod 136a.

The guide 136c is located in a position P1 shown in FIG. 19 when the switching rod 136a is raised. When the switching rod 136a is fully depressed into the housing 136b, the guide 136c is located in a position P2. Thereafter, the guide 136c and the switching rod 136a are moved back to a position P3 under a force of a not-shown spring which is mounted inside the housing 136b, and are locked in this position P3 through a not-shown lock mechanism mounted inside the housing 136b. Concurrently with the locking in the position P3, the switch 136 is turned OFF.

Thereafter when the switching rod 136a is depressed by a length L to move the guide 136c from the position P3 down to the position P2, the locked condition is released, so that the guide 136c returns to the initial position P1 along with the switching rod 136a under the force of the spring, to turn the switch 136 ON.

Figure 21:
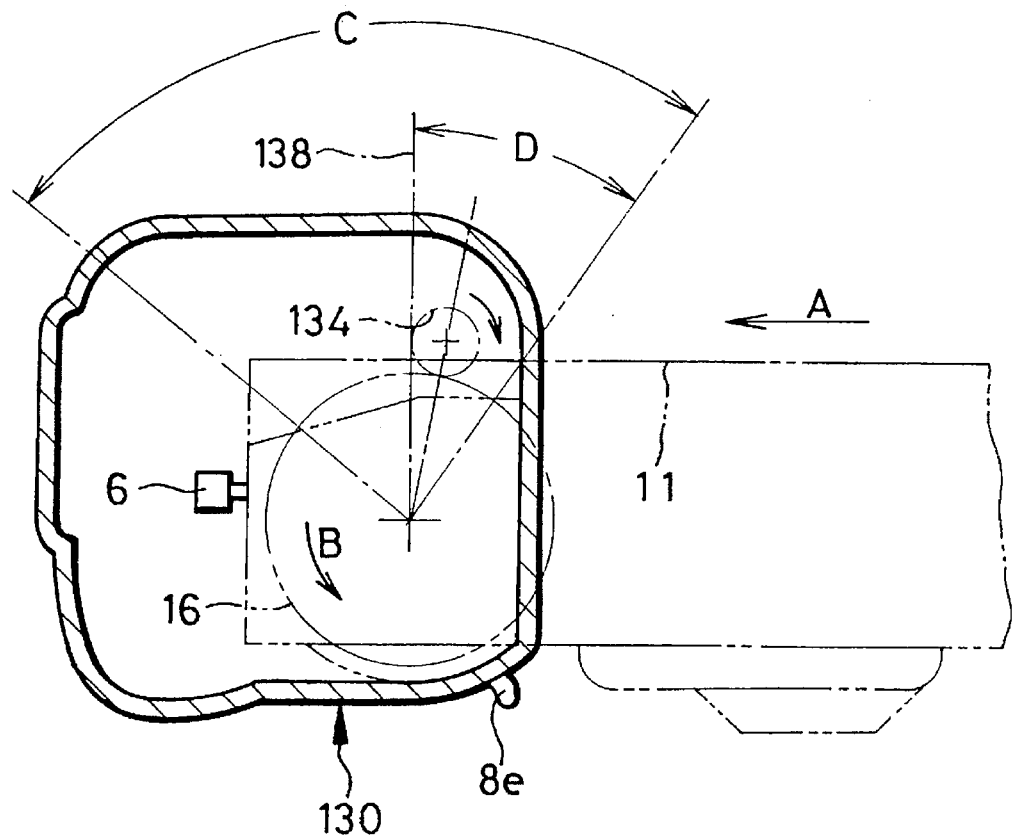
FIG. 21 is an explanatory horizontal sectional view of the film winding unit shown in FIG. 18, illustrating the condition attached to the film unit.

In the meantime, as shown in FIG. 21, the coupling gear 134 is so arranged that its gearing portion meshing with the film winding wheel 16 is located in an angular range D within the angular range C of the film winding wheel 16 that is exposed to the outside of the film unit 11. That is, the range D which is beyond a most protruding peripheral portion of the film winding wheel 16 in the direction to attach the film winding unit 130 to the film unit 11. Specifically, the range D extends from a radial line 138 perpendicular to the attaching direction A of the film unit 11 to the film winding unit 130 in the opposite direction to the film winding direction B of the film winding wheel 16. Accordingly, during the film winding, the coupling gear 134 rotates in a direction to push the film unit 11 inward of the film winding unit 130. Therefore, the engagement between the coupling gear 134 and the film winding wheel 16 would not be loosened even when the film unit 11 is a little pulled away from the film winding unit 130. Thus, the film winding unit 130 is reliably attached to the film unit 11 during handling.

Since the most protruding peripheral portion of the film winding wheel 16 in the angular range C is on the radial line 138, it is necessary to enable the gear 134 to get over the most protruding portion to gear into mesh with the wheel 16 in the position as shown in FIG. 21. For this sake, the lower bearing portion 8g is formed as an oval hole to allow the coupling gear 134 to shift away from the film winding wheel 16 during the attachment or detachment of the film winding unit 130, and also a plate spring 138 is mounted to urge the coupling gear 134 toward the gearing direction at the bottom end of the axle 134a, as shown in FIG. 19.

Figure 22:
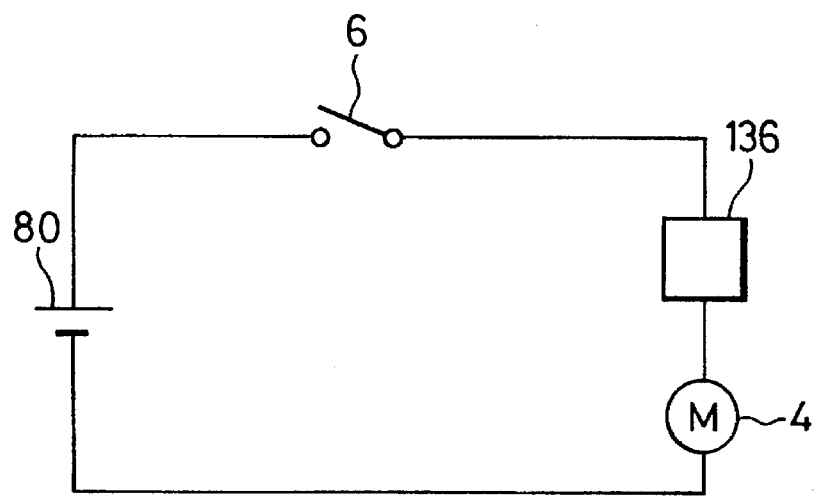
FIG. 22 is a circuit diagram of the film winding unit shown in FIG. 18.

FIG. 22 shows a circuitry of the film winding unit 130. A size AA battery 80 is connected in series to a switch 6, the switch 136 and the motor 4. In an initial or separated position of the film winding unit 130, the switch 6 is OFF, and the switch 136 is ON.

The embodiment shown in FIGS. 19 to 24 operates as follows:

In the initial position of the film winding unit 130, as shown in FIG. 20, the switch 6 is OFF, the switch 136 is ON, and the clutch gear 133 is in the power transmitting position as shown in FIG. 20, wherein the release button 24 of the shutter release plate 131 is exposed through an opening of a top cover portion 8a of the housing 8.

While the film winding unit 130 is being attached to the film unit 11, the coupling gear 134 is contacted on the periphery of the film winding wheel 16, and the axle 134a is shifted along the oval hole 8g against the force of the spring 138, so that the coupling gear 134 gets over the most protruding portion of the film winding wheel 16. Finally, the coupling gear 134 is engaged in the teeth 16a of the film winding wheel 16 under the force of the spring 138, in the position as shown in FIG. 21. Then, the switch 6 is turned ON to activate the motor 4.

The rotational movement of the motor 4 is transmitted to the clutch gear 133 through gears 4a, 75, 76, 77 and 78. Since the clutch gear 133 is in the power transmitting position, the rotational movement is transmitted to the coupling gear 134 through the disc 132. As a result, the film winding wheel 16 of the film unit 11 is rotated in the film winding direction B.

Along with this rotation of the film winding wheel 16, the filmstrip 31a is advanced, and the film winding wheel 16 is locked when the first frame is positioned behind the exposure opening of the film unit 11, in the same way as described above. Then, a large load is applied to the coupling gear 134 to cause the claws 132a of the disc 132 to slip off the claws 133a, so that the clutch gear 133 moves into the disconnecting position.

Figure 23:
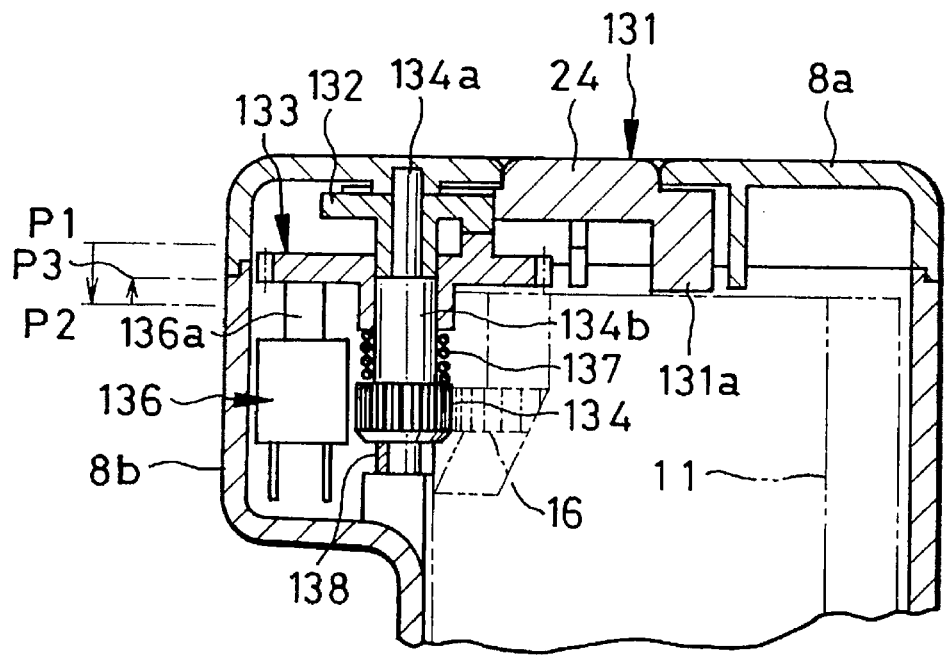
FIG. 23 a fragmentary vertical sectional view of the film winding unit show in FIG. 18, illustrating a position when the film winding wheel of the film unit is locked.

When the switching rod 136a is depressed into the housing 136b by the clutch gear 133 moving in the disconnecting position, the guide 136c moves from the position P1 to the position P2. Thereafter, the guide 136c is moved by the spring back to the position P3 and is maintained in this position by the lock mechanism, as is shown in FIG. 23. At this time, the switch 136 is turned OFF to inactivate the motor 4.

Indeed a tension is applied to the filmstrip 31a in a time period from the locking of the film winding wheel 16 to the inactivation of the motor 4. However, because the coupling gear 134 is decoupled from the clutch gear 133 when the motor 4 is inactivated, the coupling gear 134 is rotated slightly in a direction reverse to the film winding direction due to the tension on the filmstrip 31a, so that the filmstrip 31a is released from the tension. Furthermore, in the disconnecting position of the clutch gear 133, since the depressing pin 131a is in contact with the shutter button 15, the shutter release plate 131 will not be moved along with the clutch gear 133.

Figure 24:
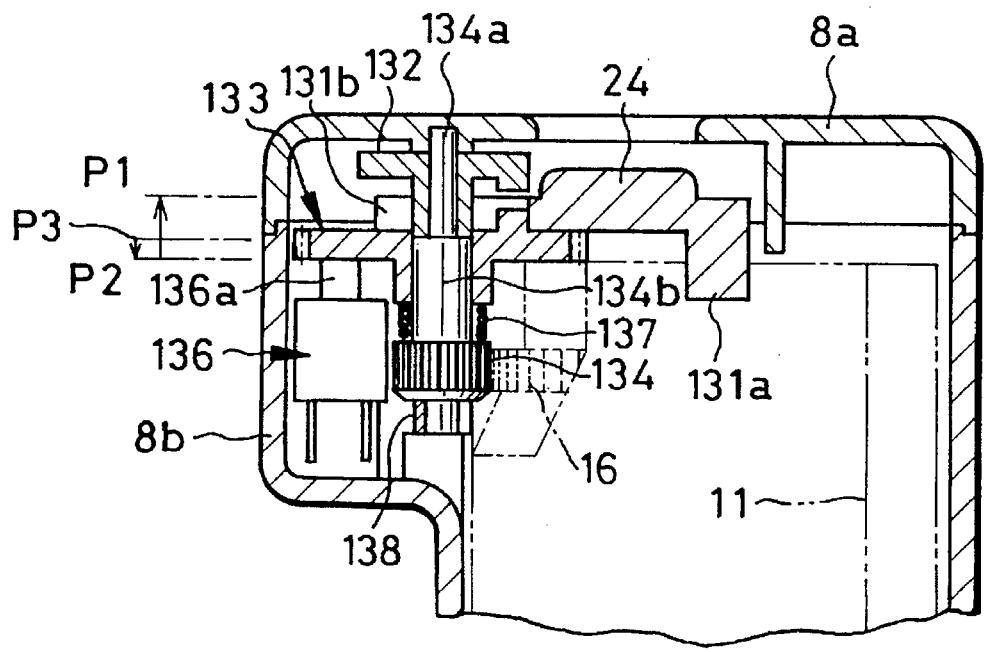
FIG. 24 is a fragmentary vertical sectional view of the film winding unit show in FIG. 18, illustrating a shutter release position.

When the release button 24 is depressed to execute an exposure, the shutter release plate 131 is moved along the axle 134a to push the clutch gear 133 down to the disconnecting position, and the depressing pin 131a depresses the shutter button 15 of the film unit 11, as is shown in FIG. 24. At that time, the exposure is accomplished by the shutter mechanism, and the guide 136c is moved from the position P3 to the position P2 to be unlocked. Since the filmstrip 31a is not in tension, the image formed on the filmstrip 31a does not suffer blurring.

When the finger is removed from the release button 24, the spring 137 pushes the clutch gear 133 back to the power transmitting position. Also the shutter release plate 131 returns to the initial position due to the returning movement of the clutch gear 133 and the resiliency of the shutter button 15. Then, the guide 136c is returned to the position P1 under the force of the spring, and the switching rod 136a is returned to the initial position as shown in FIG. 20.

When the switching rod 136a returns to the initial position, the switch 136 is turned ON to activate the motor 4. The movement of the motor 4 is transmitted to the coupling gear 134 to rotate the film winding wheel 16 in the film winding direction. Thereafter, the same operation as above is repeated until the last frame is exposed. Since the film winding wheel 16 is not locked any more after the filmstrip 31b is entirely wound into the container 31b, the motor 4 continues to rotate. It is easy for any photographer to realize that the motor 4 keeps rotating for a long time. If the photographer reads instruction printed on the outer surface of the main portion 8b of the housing 8 of the film winding unit 130, and/or reads the frame counter dial 50 through the frame counter window 21 at that time, the photographer will realize that the filmstrip 31a is completely wound up, and that it is necessary to detach the film unit 11 from the film winding unit 130.

Because the switch 6 is turned OFF upon detachment of the film unit 11 from the film winding unit 130, the motor 4 stops rotating. The film unit 11 can be smoothly detached while the axle 134a being pushed aside against the force of the plate spring 138.

FIGS. 25 to 29 show a film winding unit 140 having a motor inactivating device which inactivates a motor 4 upon a predetermined amount of rotational movement of the motor 4.

According to this embodiment, a motor activating device is constituted of a resilient release button 100 formed integrally with a housing of the film winding unit 140, a depressing lever 101 for depressing the shutter button 15 of the film unit 11 in cooperation with the release button 100, a torsion spring 141, a rotary member 142 and a plate spring 143, whereas the motor inactivating device is constituted of the torsion spring 141 and the rotary member 142. A clutch member is constituted of a clutch gear 144, a slip gear 145 and a coiled spring 146.

The clutch gear 144, which is supplied with movement of the motor 4, has a cylindrical bottom projection 144a formed coaxially therewith. The cylindrical bottom projection 144a has serrated teeth 144b around its bottom rim. The serrated teeth 144b are engageable with serrated teeth 145a which are formed around the top rim of the slip gear 145, in order to transmit the motion of the motor 4 to the slip gear 145. The slip gear 145 is coupled to a coupling gear 147 through the coiled spring 146 so that the motion of the slip gear 145 is transmitted to the coupling gear 147 by virtue of the coiling force of the coiled spring 146. The coiled spring 146 also urges the slip gear 145 toward the clutch gear 144 to maintain engagement between the teeth 145a and 144b, and causes the slip gear 145 to move downward to permit slipping between the teeth 144b and 145a when the coupling gear 147 is applied with a load.

The rotary member 142 is constituted of a shaft 142a and a cylindrical portion 142b which is formed integrally and coaxially with the shaft 142a from a conductive material. The shaft 142a is pivotally mounted between bearings formed in upper and lower portions of the housing 8, and the clutch gear 144, the slip gear 145, the coiled spring 146 and the coupling gear 147 are mounted on the shaft 142a below the cylindrical portion 142b, in this order from the top. The clutch gear 144 also has a groove 144c in the top surface thereof, and a ridge 142c formed on the bottom face of the cylindrical portion 142b may be engaged in the groove 144c so as to rotate the clutch gear 144 together with the shaft 142a. The slip gear 145 is rotatable relative to the shaft 142a, and is also slidable along the shaft 142a. The coupling gear 147 is rotatable on the shaft 142a.

The cylindrical portion 142b has a screw thread 142d around its peripheral surface, and an isolating layer is provided on the highest groove 142e of the thread 142d. A first end 141a of the torsion spring 141 extends to the vicinity of the screw thread 142d and is biased toward the thread 142d. A second end 141b of the torsion spring 141 is biased to contact on a stopper 149. The first end 141a has a horizontally bent V-shaped portion 141c, whose peak is usually in contact with the isolating layer on the highest groove 142e of the thread 142d. The torsion spring 141 is made from a conductive material.

Figure 26:
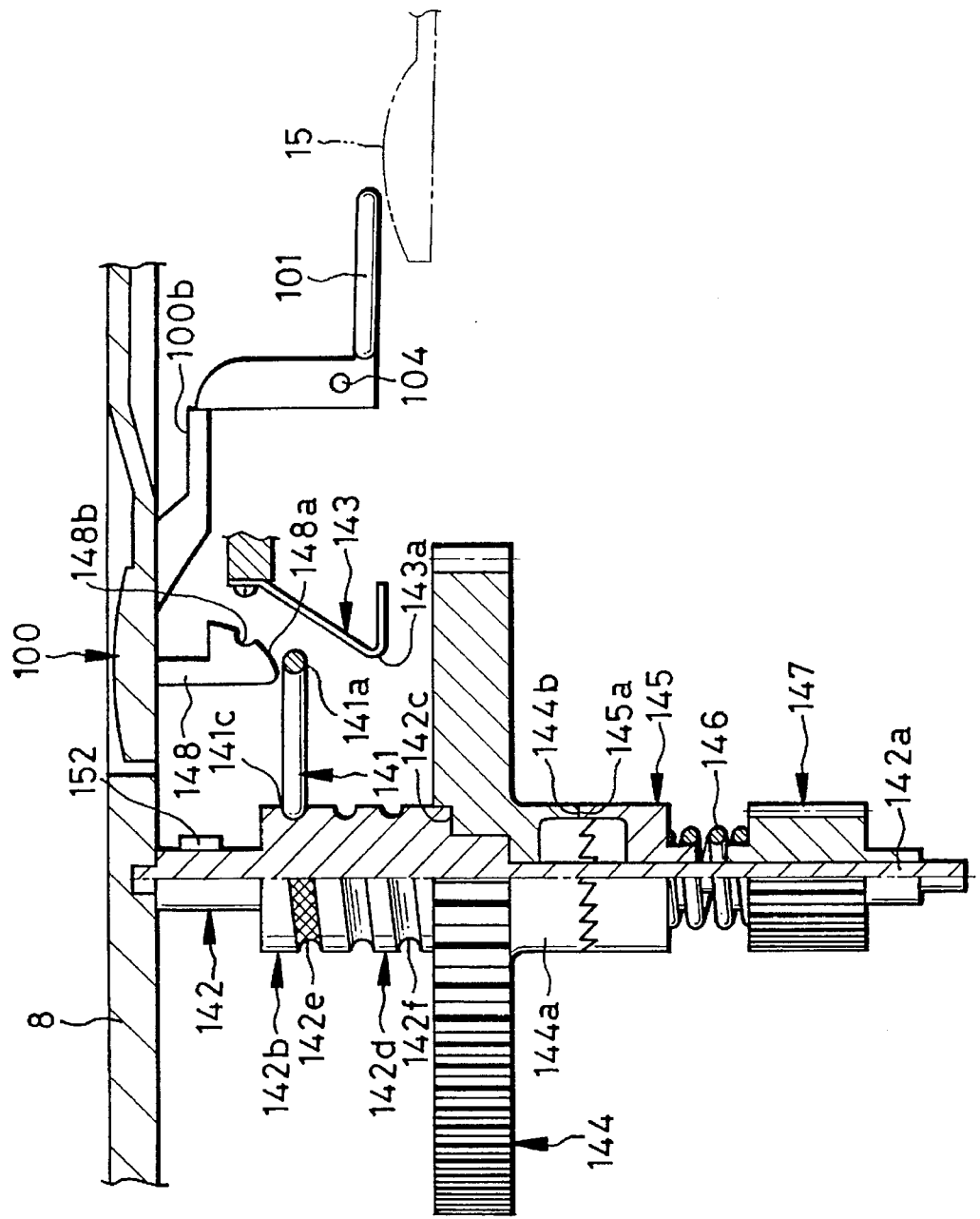
Figure 27:
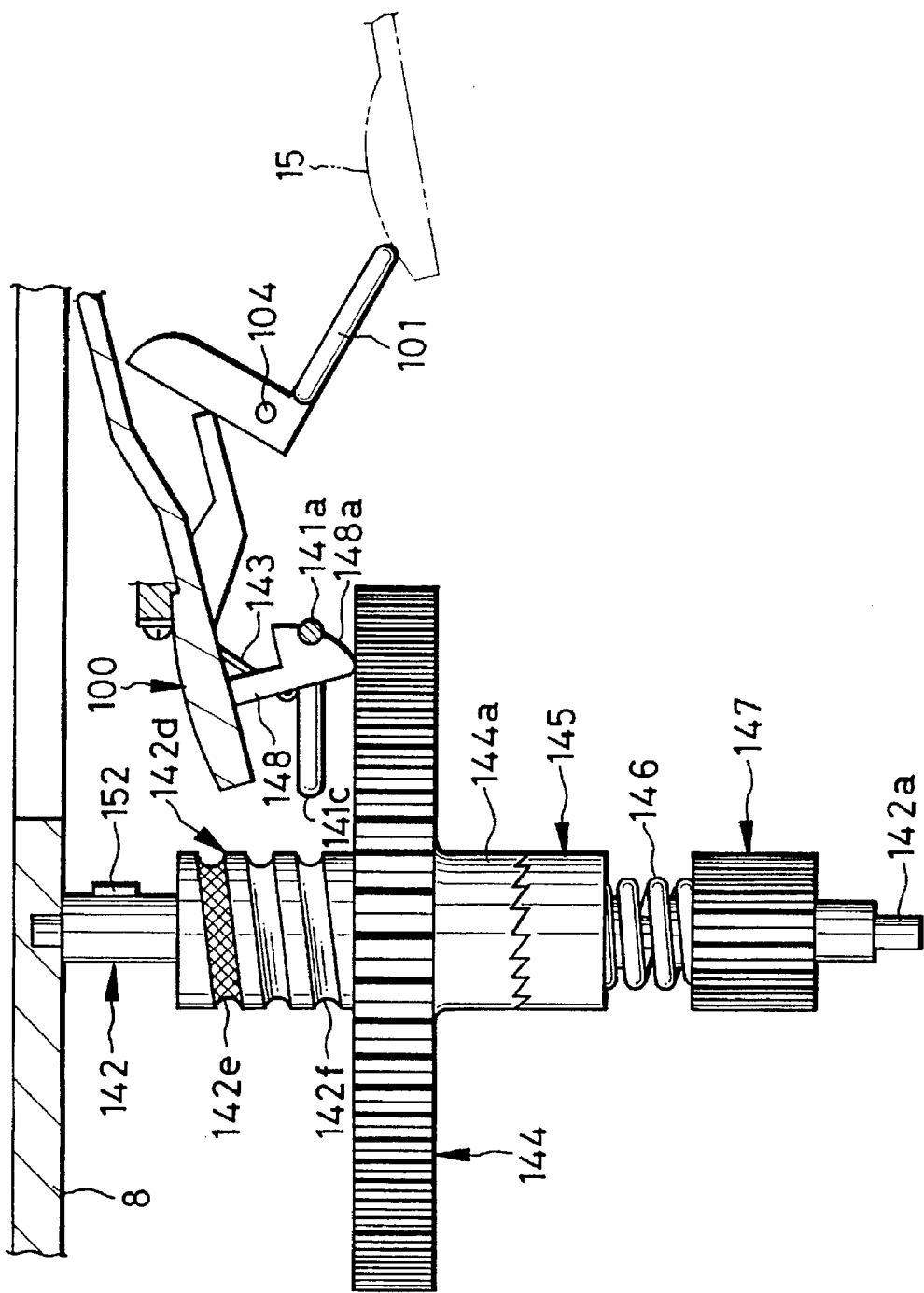

The release button 100 is movable between a rest position as shown in FIG. 26 and a shutter release position wherein a leg 100b of the release button 100 pushes the depressing lever 101 to rotate in a direction to depress the shutter button 15, as shown in FIG. 27. A second leg 148 is integrally formed on the bottom of the release button 100. The second leg 148 has a sloped end surface 148a and a hook 148b formed in the sloped end surface 148a. When the release button 100 is depressed, the first end 141a of the torsion spring 141 is pushed away from the thread 142d by the sloped end surface 148a, and then engaged in the hook 148b to be moved down to a height of the lowest groove 142f of the thread 142d.

The spring 143 is secured at its one end to the housing 8, and a free end 143a of the spring 143 is bent to form an L shape and sticks a little into the path of the first end 141a of the torsion spring 141. The first end 141a of the torsion spring 141 can get over the elbow of the L-shaped free end 143a of the plate spring 143 on the way of downward movement. Thereafter when the first end 141a is released from the depressing force, the first end 141a is stopped against the free end 143a of the plate spring 143 so that the bent portion 141c is engaged in the lowest groove 142f of the thread 142d.

Figure 25:
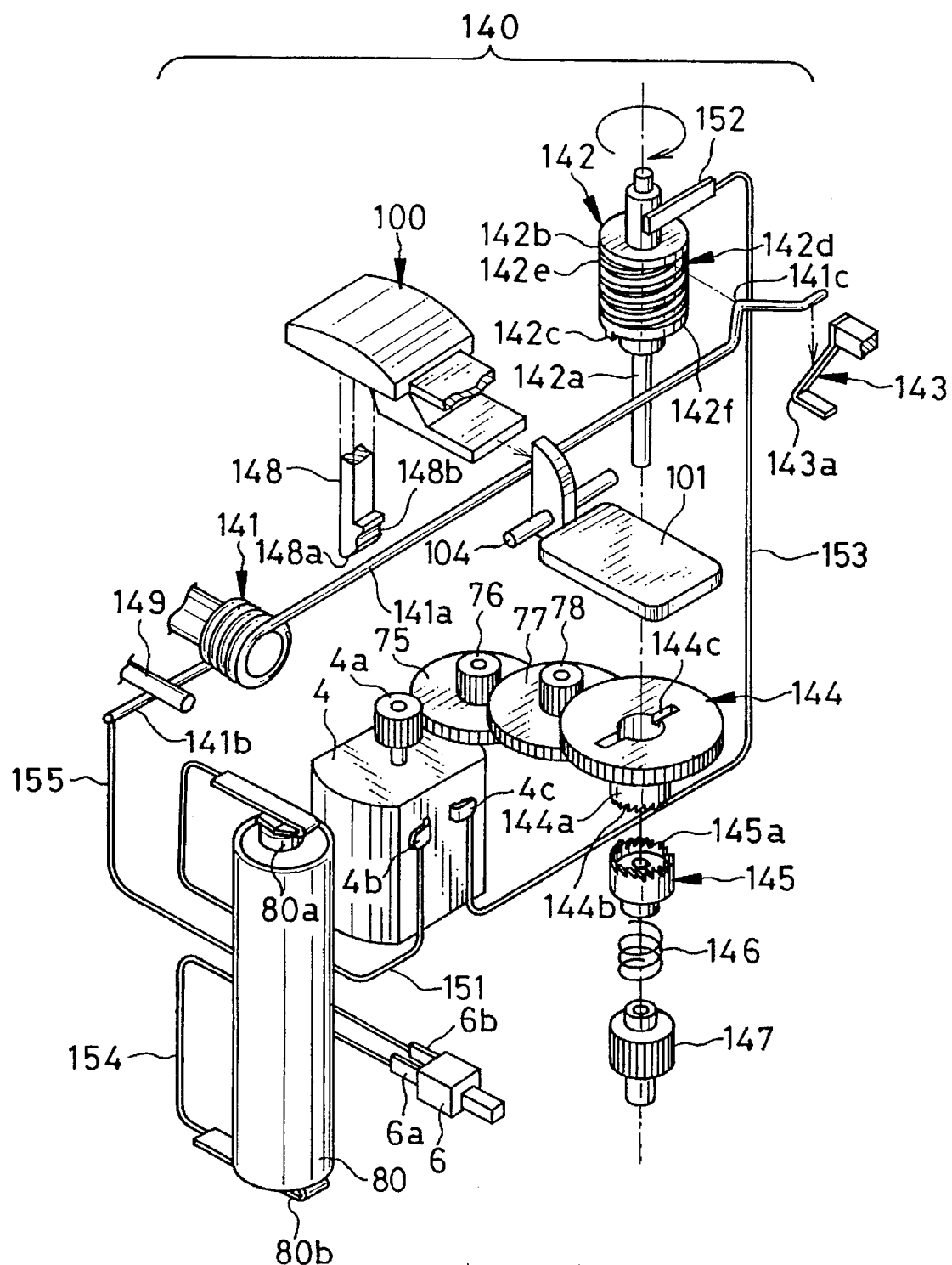
FIG. 25 is a perspective view illustrating the internal construction of a film winding unit according to a further embodiment of the invention.

The film winding unit 140 has a circuitry as shown in FIG. 25, wherein a positive electrode 80a of a battery 80 is connected to a positive pole 4b of the motor 4 through a wire 151, whereas a negative pole 4c of the motor 4 is connected to a contact plate 152 through a wire 153. The contact plate 152 slidably contacts the periphery of the rotary member 142. A negative electrode 80b of the battery 80 is connected to a contact 6a of a switch 6 through a wire 154, while another contact 6b of the switch 6 is connected to the second end 141b of the torsion spring 141 through a wire 155. Since the rotary member 142 and the torsion spring 141 are conductive, the thread 142d and the bent portion 141c form a switch which is turned ON and OFF for activating or inactivating the motor 4. The housing 8 is made from an isolating material in this embodiment so as to avoid bridging between the rotary member 142 and the torsion spring 141 through the housing 8.

When the bent portion 141c comes in contact with the lowest groove 142f of the thread 142d, the motor 4 is activated to rotate the rotary member 142 clockwise. As the thread 142d is formed as a right-handed screw, the bent portion 141c of the torsion spring 141 is pushed upward along the helical path of the thread 142d while the rotary member 142 rotates clockwise. As a result, the bent portion 141c returns to the highest groove 142e. Rotational amount of the rotary member 142 is proportional to that of the motor 4, and the rotational amount R1 of the rotary member 142 that is necessary for moving the bent portion 141c from the lowest groove 142f to the highest groove 142e of the thread 142d is set more than that taken for winding up the filmstrip 31a by the length of one frame.

The operation of the film winding unit 140 is as follows:

Initially, the film winding unit 140 is set in the position as shown in FIG. 26, wherein the bent portion 141c is in contact with the highest groove 142e of the thread 142d. Because the highest groove 142e is coated with the isolating layer, the rotary member 142 is electrically disconnected from the torsion spring 141, so that the motor 4 is inactive.

When the film winding unit 140 is attached to the film unit 11, the coupling gear 147 gears into the teeth 16a of the film winding wheel 16, and the depressing lever 101 is disposed right above the shutter button 15 of the film unit 11. Simultaneously, the film unit 11 comes in contact with the switch 6 of the film winding unit 140 to turn the switch 6 ON.

Although the motor 4 is automatically activated upon the switch 6 being turned ON in the film winding unit 130 shown in FIG. 19, the motor 4 of the film winding unit 140 is not driven even when the switch 6 is turned ON, because the bent portion 141c is still in contact with the highest groove 142e. Instructions printed on the outer surface of the housing 8 of the film winding unit 140 explains that the preliminary winding for positioning the first frame of the filmstrip 31b behind the exposure aperture is executed upon first depression of the release button 100 of the film winding unit 140.

While the release button 100 is being depressed, the second leg 148 pushes the first end 141a of the torsion spring 141 at the sloped end surface 148a, so that the first end 141a is separated from the thread 142d, and slides along the sloped end surface 148a to be engaged in the hook 148b.

Along with the further depression of the release button 100, the first end 141a is pushed down to the height of the lowest groove 142f of the thread 142d, after passing over the elbow of the free end 143a of the plate spring 143, as is shown in FIG. 27. In this position, the first end 141a of the torsion spring 141 is stopped by the free end 143a from moving upward. Although the depressing lever 101 depresses the shutter button 15 at that time, the shutter mechanism of the film unit 11 will not be actuated, since the shutter mechanism is initially set in a position slightly before the cocked position.

Figure 28:
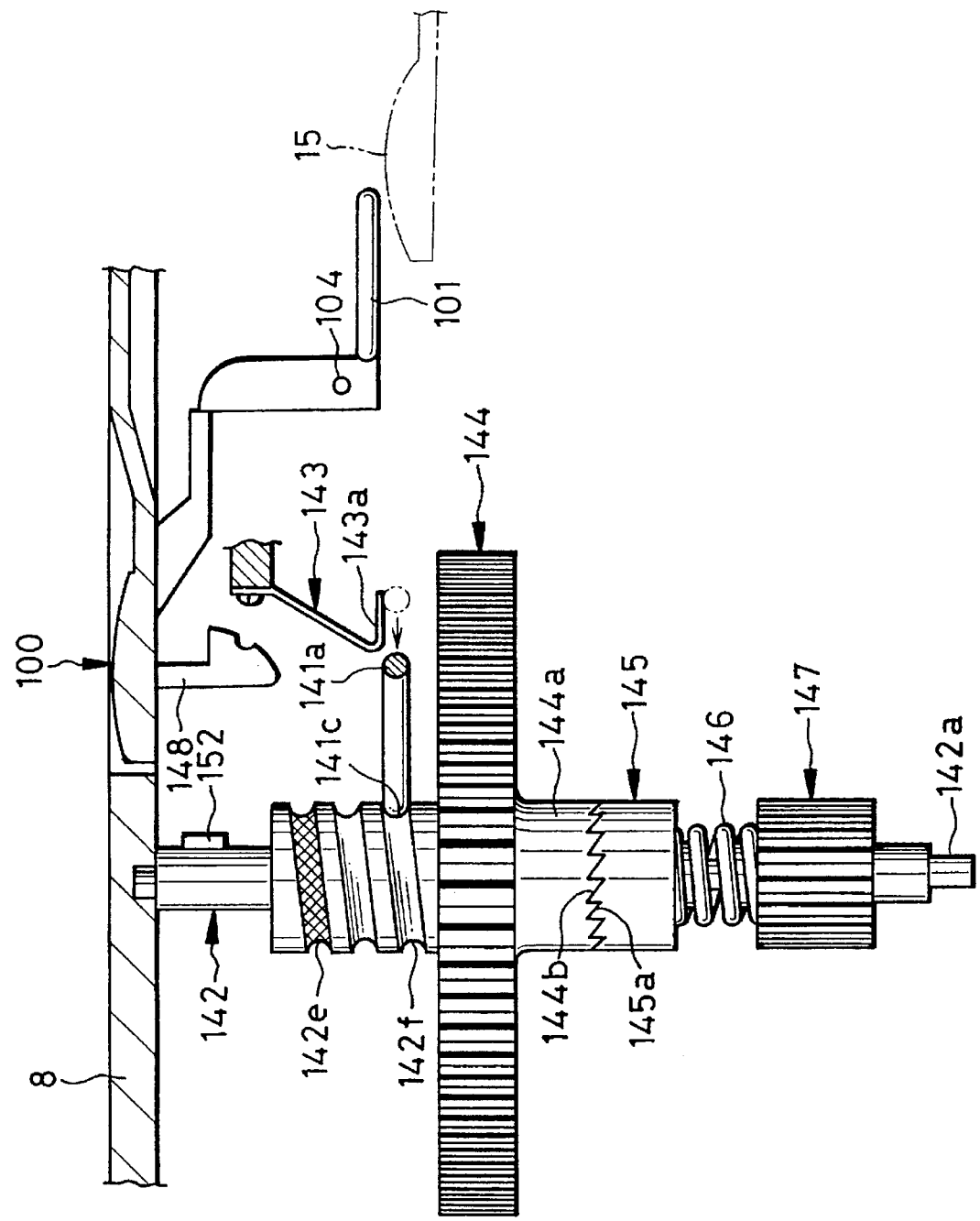

When the release button 100 is released from the depressing force, the release button 100 resiliently returns to the rest position together with the legs 100b and 148. When the leg 148 is thus retracted, the first end 141a of the torsion spring 141 will try to move upward and toward the thread 142d due to its resiliency. However, since the free end 143a of the plate spring 143 stops the first end 141a from upward movement, the first end 141a moves toward the thread 142d. As a result, the bent portion 141c of the torsion spring 141 is inserted in the lowest groove 142f of the thread 142d, as is shown in FIG. 28. At the moment when the bent portion 141c comes into contact with the lowest groove 142f, the rotary member 142 is electrically connected to the torsion spring 141 to activate the motor 4.

When the motor 4 starts rotating, the motion is transmitted to the clutch gear 144, the slip gear 145, the coiled spring 146 and the coupling gear 147, so that the film winding wheel 16 is rotated. Then, the filmstrip 31a is transported, and the screw thread 142d rotating together with the clutch gear 144 causes the bent portion 141c of the torsion spring 141 to move upward along its helical path.

Since the shutter mechanism of the film unit 11 is set in the almost cocked position, the film winding wheel 16 is locked soon after the initial winding operation, when the filmstrip 31a has been wound up by an amount less than one frame.

Figure 29:
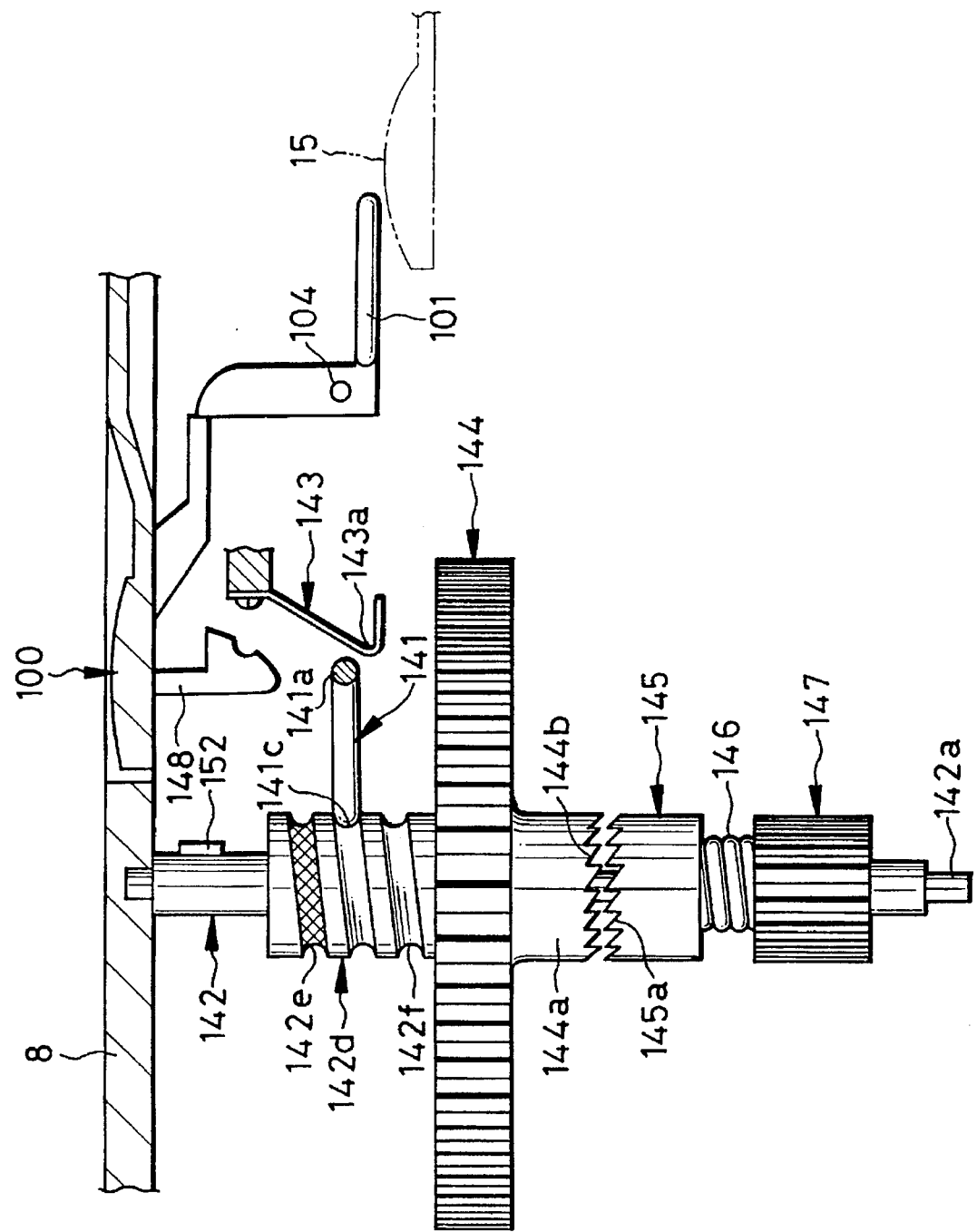

When the film winding wheel 16 is locked, the load on the coupling gear 147 so jumps up that the teeth 144b slips on the teeth 145a to cause the slip gear 145 to remove downward from the clutch gear 144 against the force of the coiled spring 146, as is shown in FIG. 29. Since the rotational amount R1 of the rotary member 142 that is necessary for bringing the bent portion 141c from the lowest groove 142f to the highest groove 142e of the thread 142d is set more than that required for winding up the filmstrip 31a by one-frame amount, the bent portion 141c of the torsion spring 141 will not reach the highest groove 142e in this stage. Therefore, the motor 4 continues rotating.

Thereafter when the bent portion 141c reaches the highest groove 142e, the rotary member 142 is electrically disconnected from the torsion spring 141, so that the motor 4 is inactivated. Thus, the film winding unit 140 returns to the initial position as shown in FIG. 26, whereas the first frame of the filmstrip 31a is positioned behind the exposure aperture of the film unit 11. Although a tension is applied to the filmstrip 31a in a time period from the locking of the film winding wheel 16 to the stop of the motor 4, the filmstrip 31a is released from the tension when the motor 4 stops, because the coupling gear 147 is always rotatable in an unwinding direction that is reverse to the coiling force of the coiled spring 146, and is slightly rotated in the unwinding direction due to the tension on the filmstrip 31a at the moment of inactivation of the motor 4.

To make an exposure, the release button 100 is depressed again, so that the second leg 148 pushes the first end 141a of the torsion spring 141 down to the height of the lowest groove 142f of the thread 142d, as is shown in FIG. 27. In this position, the depressing lever 101 depresses the shutter button 15 to actuate the shutter mechanism of the film unit 11 to expose the first frame of the filmstrip 31a.

When the release button 100 is released from the depressing force, the release button 100 resiliently returns to the rest position together with the legs 100b and 148. Then, the first end 141a of the torsion spring 141 moves toward the thread 142d to bring the bent portion 141c into engagement with the lowest groove 142f of the thread 142d, as is shown in FIG. 28. At this moment, the motor 4 is activated.

When the motor 4 starts rotating, the motion is transmitted to the coupling gear 147, so that the film winding wheel 16 is rotated to transport the filmstrip 31a. Also, the screw thread 142d causes the bent portion 141c of the torsion spring 141 to move upward along its helical path.

When the filmstrip 31a has been wound up by one frame amount, the film winding wheel 16 is locked. When the film winding wheel 16 is locked, the load on the coupling gear 147 so jumps up that the teeth 144b slips on the teeth 145a to cause the slip gear 145 to remove downward from the clutch gear 144 against the force of the coiled spring 146, as is shown in FIG. 29. Since the rotational amount R1 of the rotary member 142 that is necessary for bringing the bent portion 141c from the lowest groove 142f to the highest groove 142e of the thread 142d is set more than that taken for winding up the filmstrip 31a by one-frame amount, the bent portion 141c of the torsion spring 141 is placed slightly before the highest groove 142e in the position shown in FIG. 29.

Thereafter when the bent portion 141c reaches the highest groove 142e, the rotary member 142 is electrically disconnected from the torsion spring 141, so that the motor 4 is inactivated. Thus, the film winding unit 140 returns to the initial position as shown in FIG. 26. Thereafter, the same operation as above is repeated for automatically winding the filmstrip 31a by only depressing the release button 100.

As the photographing proceeds, the diameter of the roll of exposed filmstrip 31a wound around the spool 31c in the container 31b becomes larger, so that the less rotational amount of the motor 4 is necessary for winding up the filmstrip 31a by one-frame. In other wards, the motor 4 must rotate for winding up the first frame the largest amount Rmax among those necessary for any other frames of one filmstrip 31a. Therefore, the rotational amount R1 of the rotary member 142 necessary for bringing the bent portion 141c from the lowest groove 142f to the highest groove 142e of the screw thread 142d is set larger than that corresponding to the rotational amount Rmax for the first frame winding of the motor 4.

Finally, upon exposure of the last frame, the motor 4 is driven to wind up the filmstrip 31a completely into the container 31b. Since the last frame is arranged such that the length of a portion of the filmstrip 31a that remains unexposed behind the last frame will be shorter than the length of one frame, the remaining portion of the filmstrip 31a is entirely wound into the container 31b by rotating the film winding wheel 16 less amount than that is necessary for one-frame advance. Consequently, the bent portion 141c of the torsion spring 141 does not reach the highest groove 142e of the screw thread 142d at this moment, so that the motor 4 continues rotating. Thereafter, when the bent portion 141c reaches the highest groove 142e, the motor 4 is automatically inactivated. Then, the film winding unit 140 can be safely separated from the film unit 11, and repeatedly used in combination with another film unit.

Even if the film winding unit 140 is accidentally removed from the film unit 11, the switch 6 is turned OFF to inactivate the motor 4. Therefore, the film winding unit 140 is safe and secure. Although the bent portion 141c stops midway of the screw thread 142d at that time, it is no problem because the film winding unit 140 will automatically start to continue the interrupted winding operation if only the winding unit 140 is attached to the film unit 11 again, without the need for depressing the release button 100. Also, it may be possible to omit the switch 6 from the film winding unit 140.

While the rotational amount R1 of the rotary member 142 that is necessary for moving the bent portion 141c from the lowest groove 142f to the highest groove 142e of the thread 142d is set more than that necessary for winding up the filmstrip 31a by one-frame amount in the above described embodiment, this definition of the value R1 should not be applied for any case. For instance, in a case where the motor 4 must rotate a larger amount Rp for the preliminary winding to position the first frame, than that necessary for one-frame advance, it is desirable to set the rotational amount R1 of the rotary member 142 more than a value corresponding to the rotational amount Rp for the preliminary winding of the motor 4. If the motor 4 must rotate a larger amount Rf for the final winding to wind up the filmstrip 31a fully into the container 31b after the last exposure, than that necessary for one-frame advance, it is desirable to set the rotational amount R1 of the rotary member 142 more than a value corresponding to the rotational amount Rf for the final winding of the motor 4.

In the embodiment shown in FIG. 25, the clutch member utilizes friction between the teeth 144b and 145a of the clutch gear 144 and the slip gear 145. However, because of wearing of the teeth 144b and 145a, the torque value for causing the slip therebetween may change so much in a long time that the film winding cannot be sufficiently effected any more. A clutch member as shown in FIG. 30 can avoid this problem and is superior in durability.

Figure 30:
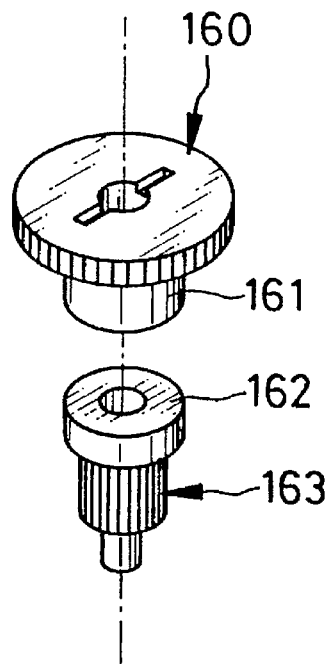
FIG. 30 is a perspective view of a clutch member using magnets according to another embodiment of the invention.

In the embodiment shown in FIG. 30, a clutch gear 160 and a coupling gear 162 respectively have first and second magnet discs 161 and 163 integrally therewith, and these members 160 to 163 are mounted on the shaft 142a of the rotary member 142 in place of the clutch gear 144, the slip gear 145, the coiled spring 146 and the coupling gear 147. The first and second magnet discs 161 and 163 are arranged to oppose their opposite poles to each other to attract to each other. This embodiment is preferable not only because it will not be worn out, but also because it takes less cost of the mechanism.

Figure 31:
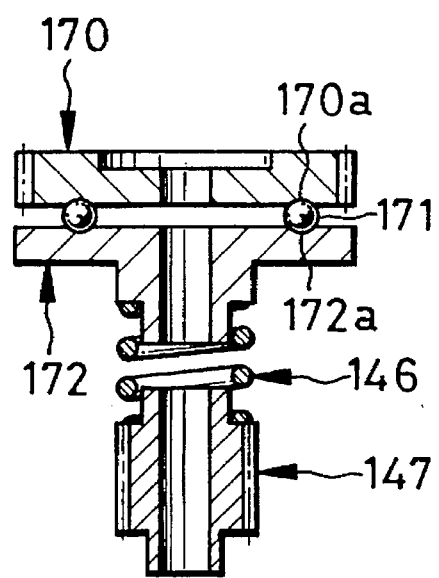
FIG. 31 is a vertical sectional view of a clutch member using steel ball according to still another embodiment of the invention.

It is also preferable to constitute a clutch member as shown in FIG. 31, wherein the rotational movement of the clutch gear 170 is transmitted to a slip disc 172 through at least two steel balls 171, and the rotational movement of the slip disc 172 is transmitted to a coupling gear 147 through a coiled spring 146 like as the embodiment shown in FIG. 25. In this embodiment, the clutch gear 170 and the slip disc 172 need to have recesses 170a and 172a for accepting the steel balls 171, respectively.

While the present invention has been described with respect to those embodiments which are removably attached to the film unit 11 preloaded with the filmstrip 31a, the present invention is applicable not only to any types of film unit but also to cameras such as a manual winding compact camera which are repeatedly loaded with film. The film winding unit of the invention is not limited to use as an attachment, but may be mounted in a camera as a built-in component.

As a driving device for the film winding unit, a spring or clockwork may be applicable in place of the motor. In this modification, a charging mechanism for the clockwork may be operated before starting the photography to charge an energy in the spring necessary for winding a strip of photographic film, e.g., for winding 24 to 36 frames.

Although a size AA battery is used as the power source, another type power source is applicable so long as its voltage is 1.5 V, because the speed and the rotational torque of the motor will not change at the same supply voltage. For example, a 1.5 V cell element of a layer-built cell may be preferably used as the power source because the cell element is smaller than the AA battery and hence will improve the compactness of the film winding unit. It is desirable that the power source has enough capacity to accomplish winding of a roll of photographic filmstrip.

As described so far, according to the present invention, when the film winding wheel is locked by the mechanism of the film unit or the camera, the clutch member of the film winding unit slips to disconnect the drive source from the spool of the container, so that the filmstrip gets out of tension. Therefore, deviation of the filmstrip will not be caused at the moment when the film winding wheel is unlocked with the shutter release operation, which would otherwise be caused by the tension on the filmstrip. Thus, image recorded on the filmstrip is prevented from being blurred. Also the load on the power transmission mechanism is reduced to improve security and durability of the film winding unit.

While the present invention has been described with respect to the preferred embodiments shown in the drawings, the present invention is not to be limited to the above-described embodiments, but on the contrary, various modifications may be possible without departing from the scope of the appended claims.

What is claimed is:

1. In a film winding device for a camera having a film winding mechanism which winds up a filmstrip on a spool by rotating the spool and has means which is locked to stop rotating the spool each time the filmstrip has been advanced one frame amount, and a shutter mechanism which is cocked during the one frame advance of the filmstrip and is released to make an exposure upon depression of a shutter button, wherein said means of said film winding mechanism is unlocked responsive to the shutter mechanism being released, said film winding device comprising:

a drive source;

a rotary member which can be coupled to the spool to drive the spool to rotate in a film winding direction;

a power transmission device for transmitting rotational movement of said drive source to said rotary member;

an activating device for activating said drive source after the shutter mechanism is released;

a clutch member included in said power transmission device so as to disconnect said drive source from the spool when the film winding mechanism is locked; and an inactivating device for inactivating said drive source in cooperation with the disconnecting movement of said clutch member;

the improvement wherein said clutch member slips to move to a disconnecting position responsive to a high load which is applied no said drive source and said power transmission device when said film winding mechanism is locked, and said inactivating device inactivates said drive source when said inactivating device detects that said clutch member moves to said disconnecting position.

2. A film winding device as recited in claim 1, wherein the camera includes a lens-fitted photographic film unit which is preloaded with a roll of unexposed film and a container for winding up the film thereinto after each exposure, and the spool is rotatably mounted in said container.

3. A film winding device as recited in claim 2, wherein said film winding device is removably attachable to the camera.

4. A film winding device as recited in claim 3, further comprising a depressing member which may be depressed from an initial position to a depressing position for depressing the shutter button of the camera and may resiliently return to said initial position, wherein said activating device activates said drive source in cooperation with resilient returning movement of said depressing member to said initial position.

5. A film winding device as recited in claim 3, further comprising a switch for detecting attachment of the camera to said film winding unit and inactivating said drive source when the camera is detached from said film winding unit.

6. A film winding device as recited in claim 3, wherein said rotary member is a drive gear which is coupled to the spool through a film winding wheel of the camera, said drive gear gearing into teeth formed around the periphery of the film winding wheel of the camera when said film winding device is attached to the camera, said film winding wheel partly protruding out of the camera so as to permit externally rotating the spool.

7. A film winding device as recited in claim 6, wherein said film winding device is attached to the camera in a radial direction of said film winding wheel, and said drive gear meshes with said film winding wheel on the side of a radius of said film winding wheel in the film winding device attaching direction, said radius being perpendicular to said direction.

8. A film winding device as recited in claim 1, wherein said drive source is a motor.

9. A film winding device as recited in claim 8, further comprising a power source for supplying said motor with voltage of 1.5 V, said power source being an exchangeable cell which is not larger than a size AA battery in size.

10. In a film winding device for a camera having a film winding mechanism which winds up a filmstrip on a spool by rotating the spool and has means which is locked to stop rotating the spool each time the filmstrip has been advanced one frame amount, and a shutter mechanism which is cocked during the one frame advance of the filmstrip and is released to make an exposure upon depression of a shutter button, wherein said means of said film winding mechanism is unlocked responsive to the shutter mechanism being released, said film winding device comprising:

a drive source;

a rotary member which can be coupled to the spool to drive the spool to rotate in a film winding direction;

a power transmission device for transmitting rotational movement of said drive source to said rotary member;

an activation switch member for activating said drive source;

an inactivation switch member for inactivating said drive source;

a retaining member which turns said activation switch ON and retaining said activation switch in ON position after the shutter button is depressed;

a clutching and inactivating member included in said power transmission device so as to disconnect said drive source from the spool when the film winding mechanism is locked and, simultaneously, turn said inactivation switch member ON to inactivate said drive source; and a canceling member for canceling the retaining operation of said retaining member to turn said activation switch OFF in cooperation with said clutching and inactivating member when said clutching and inactivating device turns said inactivation switch member ON;

the improvement wherein said clutching and inactivating member slips to move in a disconnecting position due to a large amount of load which is applied to said drive source and said power transmission device when said film winding mechanism is locked, and inactivates said drive source when said clutching and inactivating member slips into said disconnecting position, and said canceling member cancels the retaining operation of said retaining member in cooperation with the slip of said clutching and inactivating member into said disconnecting position.

* * * * *